(12) United States Patent
Fernandez et al.

(10) Patent No.: US 12,539,428 B2
(45) Date of Patent: Feb. 3, 2026

(54) IMPLANTABLE NEURAL STIMULATION DEVICE

(71) Applicants: Saluda Medical Pty Ltd, Level 1 (AU); Greatbatch Ltd., Clarence, NY (US)

(72) Inventors: Federica Fernandez, Montevideo (UY); Luis Daniel Villamil, Montevideo (UY); Andrew Hancock, Fremont, CA (US)

(73) Assignees: Saluda Medical Pty Ltd, Macquarie Park (AU); Greatbatch Ltd., Clarence, NY (US)

( * ) Notice: Subject to any disclaimer, the term of this patent is extended or adjusted under 35 U.S.C. 154(b) by 376 days.

(21) Appl. No.: 18/185,289

(22) Filed: Mar. 16, 2023

(65) Prior Publication Data
US 2023/0321451 A1     Oct. 12, 2023

Related U.S. Application Data

(60) Provisional application No. 63/320,543, filed on Mar. 16, 2022.

(51) Int. Cl.
*A61N 1/375*     (2006.01)
*A61N 1/372*     (2006.01)
*A61N 1/378*     (2006.01)

(52) U.S. Cl.
CPC ....... *A61N 1/3758* (2013.01); *A61N 1/37229* (2013.01); *A61N 1/3754* (2013.01); *A61N 1/3787* (2013.01)

(58) Field of Classification Search
CPC .............. A61N 1/3758; A61N 1/37229; A61N 1/3754; A61N 1/3787
See application file for complete search history.

(56) References Cited

U.S. PATENT DOCUMENTS 6,154,677 A     11/2000  Leysieffer
7,103,413 B2     9/2006  Swanson et al.
(Continued)

FOREIGN PATENT DOCUMENTS

WO     WO2003075414 A1     9/2003
WO     WO2004047910 A3     8/2004
(Continued)

OTHER PUBLICATIONS

Cong et al., Wireless Implantable Blood Pressure Sensing Microsystem Design for Monitoring of Small Laboratory Animals, Sensors and Materials vol. 20 No. 7 (2008) at 327-340.
(Continued)

*Primary Examiner* — Catherine M Voorhees
(74) *Attorney, Agent, or Firm* — Barnes & Thornburg LLP

(57) ABSTRACT

An implantable neural stimulation device is provided, comprising a body containing stimulation electronics, and a battery to provide stimulation energy, a lid, coupled to the body, the lid configured to at least partially seal the body and a header coupled to the body of the device. The header comprises a contact assembly electrically coupled to the stimulation electronics via at least one feedthrough wire extending through the lid, the contact assembly configured to connect to a stimulation lead to deliver the stimulation energy from the battery under control by the stimulation electronics, a charge coil configured to charge the battery, and a support component configured to support the charge coil. The support component is supported in position by the contact assembly.

19 Claims, 19 Drawing Sheets

(56) References Cited

U.S. PATENT DOCUMENTS

| | | | |
|---|---|---|---|
| 7,751,893 B2 * | 7/2010 | Biggs, Jr. ............ | A61N 1/3752 607/36 |
| 8,096,838 B2 | 1/2012 | Dilmaghanian | |
| 8,126,545 B2 | 2/2012 | Flach et al. | |
| 8,346,362 B2 | 1/2013 | Kinney et al. | |
| 8,442,637 B2 | 5/2013 | Mcdonald | |
| 8,619,002 B2 | 12/2013 | Rawat et al. | |
| 8,690,609 B2 | 4/2014 | Poon et al. | |
| 8,938,298 B2 | 1/2015 | Smith et al. | |
| 9,283,394 B2 | 3/2016 | Whitehurst et al. | |
| 9,731,111 B2 | 8/2017 | Derohan et al. | |
| 10,603,484 B2 | 3/2020 | Bakker et al. | |
| D953,532 S | 5/2022 | Stallard et al. | |
| 11,497,922 B2 | 11/2022 | Muessig et al. | |
| 11,583,682 B2 | 2/2023 | Pflug et al. | |
| 2008/0294219 A1 | 11/2008 | Osypka et al. | |
| 2009/0240309 A1 | 9/2009 | Rahman | |
| 2010/0038132 A1 * | 2/2010 | Kinney ............... | A61N 1/3754 607/2 |
| 2012/0123497 A1 * | 5/2012 | Sherva ............... | B29C 45/1671 606/1 |
| 2013/0116763 A1 * | 5/2013 | Parker ............... | A61N 1/3787 29/874 |
| 2013/0150915 A1 * | 6/2013 | Kane ............... | A61N 1/37512 607/36 |
| 2021/0322765 A1 | 10/2021 | Fried | |
| 2022/0023643 A1 | 1/2022 | Carter et al. | |
| 2022/0176132 A1 * | 6/2022 | Pflug ............... | A61N 1/375 |
| 2023/0056675 A1 | 2/2023 | Lopez | |
| 2023/0321451 A1 | 10/2023 | Fernandez et al. | |

FOREIGN PATENT DOCUMENTS

| | | | |
|---|---|---|---|
| WO | WO2004052458 B1 | 9/2004 | |
| WO | WO2005032656 A1 | 4/2005 | |
| WO | WO2006026186 B1 | 12/2006 | |
| WO | WO2007059374 A3 | 11/2007 | |
| WO | WO2008088566 A1 | 7/2008 | |
| WO | WO2008127990 A3 | 12/2008 | |
| WO | WO2009059152 A1 | 5/2009 | |
| WO | WO2009132091 A2 | 10/2009 | |
| WO | WO2010078100 A1 | 7/2010 | |
| WO | WO2010117383 A1 | 10/2010 | |
| WO | WO2011059531 A1 | 5/2011 | |
| WO | WO2011059564 A1 | 5/2011 | |
| WO | WO2011066478 A1 | 6/2011 | |
| WO | WO2011094074 A1 | 8/2011 | |
| WO | WO2012116214 A1 | 8/2012 | |
| WO | WO 2012155183 | 11/2012 | |
| WO | WO2013067538 A1 | 5/2013 | |
| WO | WO2013075178 A1 | 5/2013 | |
| WO | WO2013090304 A1 | 6/2013 | |
| WO | WO2014078019 A1 | 5/2014 | |
| WO | WO2014179685 A1 | 11/2014 | |
| WO | WO 2015074121 | 5/2015 | |
| WO | WO2015088690 A3 | 8/2015 | |
| WO | WO2016168798 A1 | 10/2016 | |
| WO | WO2017062545 A1 | 4/2017 | |
| WO | WO2019183386 A1 | 9/2019 | |
| WO | WO2019213181 A1 | 11/2019 | |
| WO | WO 2020000039 | 1/2020 | |
| WO | WO-2020000039 A1 * | 1/2020 | ......... A61N 1/36125 |
| WO | WO2023130102 A1 | 7/2023 | |

OTHER PUBLICATIONS

Smith et al., "An Externally Powered, Multichannel, Implantable Stimulator for Versatile Control of Paralyzed Muscle", IEEE Transactions on Biomedical Engineering vol. 34, No. 7 (1987) at 499-508.

Smith et al., "An Externally Powered, Multichannel, Implantable Stimulator-Telemeter for Control of Paralyzed Muscle", IEEE Transactions on Biomedical Engineering vol. 45, No. 4 (1998) at 463-475.

* cited by examiner

IMPLANTABLE NEURAL STIMULATION DEVICE

CROSS-REFERENCE TO RELATED APPLICATIONS

The current application claims priority under 35 U.S.C. 119(e) to U.S. Provisional Patent Application Ser. No. 63/320,543, entitled "Implantable Neural Stimulation Device", filed Mar. 16, 2022. The disclosure of U.S. Provisional Patent Application Ser. No. 63/320,543 is hereby incorporated herein by reference in its entirety.

TECHNICAL FIELD

The present invention relates to an implantable neural stimulation device. The device may, in some examples, be used to treat medical conditions.

BACKGROUND OF THE INVENTION

There are a range of situations in which it is desirable to apply neural stimuli in order to alter neural function, a process known as neuromodulation. For example, neuromodulation is used to treat a variety of disorders including chronic neuropathic pain, Parkinson's disease, and migraine. A neuromodulation system applies an electrical pulse (stimulus) to neural tissue (fibres, or neurons) in order to generate a therapeutic effect. In general, the electrical stimulus generated by a neuromodulation system evokes a neural action potential in a neural fibre which then has either an inhibitory or excitatory effect. Inhibitory effects can be used to modulate an undesired process such as the transmission of pain, or excitatory effects may be used to cause a desired effect such as the contraction of a muscle.

When used to relieve neuropathic pain originating in the trunk and limbs, the electrical pulse is applied to the dorsal column (DC) of the spinal cord, a procedure referred to as spinal cord stimulation (SCS). Such a system typically comprises an implanted electrical pulse generator, and a power source such as a battery that may be transcutaneously rechargeable by wireless means, such as inductive transfer. An electrode array is connected to the pulse generator, and is positioned adjacent the target neural fibre(s) in the spinal cord, typically in the dorsal epidural space above the dorsal column. An electrical pulse of sufficient intensity applied to the target neural fibres by a stimulus electrode causes the depolarisation of neurons in the fibres, which in turn generates a response known as an action potential in the fibres. Action potentials propagate along the fibres in orthodromic (towards the head, or rostral) and antidromic (towards the cauda, or caudal) directions. The fibres being stimulated in this way inhibit the transmission of pain from a region of the body innervated by the target neural fibres (the dermatome) to the brain. To sustain the pain relief effects, stimuli are applied repeatedly, for example at a frequency in the range of 30 Hz-100 Hz.

For effective and comfortable neuromodulation, it is necessary to maintain stimulus intensity above a recruitment threshold. Stimuli below the recruitment threshold will fail to recruit sufficient neurons to generate action potentials with a therapeutic effect. In almost all neuromodulation applications, response from a single class of fibre is desired, but the stimulus waveforms employed can evoke action potentials in other classes of fibres which cause unwanted side effects. In pain relief, it is therefore desirable to apply stimuli with intensity below a comfort threshold, above which uncomfortable or painful percepts arise due to over-recruitment of $A\beta$ fibres. When recruitment is too large, $A\beta$ fibres produce uncomfortable sensations. Stimulation at high intensity may even recruit $A\delta$ fibres, which are sensory nerve fibres associated with acute pain, cold and pressure sensation. It is therefore desirable to maintain stimulus intensity within a therapeutic range between the recruitment threshold and the comfort threshold.

Some stimulator devices comprise a header component coupled to a body. The header may contain a charge coil to charge a rechargeable battery of the implanted stimulator via, for example transcutaneous inductive transfer. The form and position of the charge coil in the header of the implanted stimulation device may influence the efficacy of the transcutaneous inductive transfer of charge from a charging device, external to the patient, to the battery of the implanted stimulation device. For example, a charge coil that is positioned, relative to the plane of the patient's skin, in such a way as to be obscured by other components of the stimulation device, may have reduced efficacy in charging the battery of the stimulation device.

Accordingly, for efficient and effective charging of the battery, it may be desirable to maintain the form and position of the charge coil in a preferred form and position. Additionally, for safety and durability of function of the stimulation device, it may be desirable to securely maintain the form and position of a charge coil of a stimulation device.

Approaches proposed for arranging the components of a stimulator are described by the present applicant in International Patent Publication No. WO 2020/000039, the contents of which is incorporated herein by reference Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood to mean that the element may be any one of the listed options, or may be any combination of two or more of the listed options.

SUMMARY OF THE INVENTION

Disclosed herein is an electronics module of a neural stimulation device configured to provide neural stimulation to a patient. The electronics modules comprises a header coupled to a body. The body forms a shell contains stimulation electronics and a battery. The shell is sealed with a lid. The header comprises a charge coil configured to charge a battery of the electronics module via transcutaneous electromagnetic induction. The charge coil is supported in position in the header by a support component that is raised above the surface of the lid of the body of the electronics module. The support component is supported in position by the contact assembly.

According to a first aspect of the present technology, there is provided an implantable neural stimulation device comprising a body containing stimulation electronics, and a battery to provide stimulation energy, a lid, coupled to the body, the lid configured to at least partially seal the body, a header coupled to the body of the device. The header comprises a contact assembly electrically coupled to the stimulation electronics via at least one wire extending through the lid, the contact assembly configured to connect to a stimulation lead to deliver the stimulation energy from the battery under control by the stimulation electronics. The header further comprises a charge coil configured to charge the battery, and a support component configured to support the charge coil. The support component is supported in position by the contact assembly.

In some embodiments, the header further comprises a polymeric encasing material which substantially encases the support component and the contact assembly. In some embodiments, the support component is isolated from the lid by the encasing material. In some embodiments, the support component is not in contact with the lid.

In some embodiments, the contact assembly comprises at least one output terminal, an end section and a receiving block. In some embodiments, the contact assembly comprises a mounting protrusion, and the support component comprises a mounting recess, and wherein the mounting protrusion of the contact assembly is positioned within a mounting recess of the support component. In some embodiments, the mounting protrusion of the contact assembly is adjoined to the receiving block of the contact assembly. In some embodiments, the contact assembly comprises a first contact assembly and a second contact assembly.

In some embodiments, the header comprises a cavity between the first contact assembly and the second contact assembly, and the support component comprises a mounting protrusion configured to fit within the cavity between the first contact assembly and the second contact assembly. In some embodiments, the support component is adhered to the contact assembly by adhesive.

In some embodiments, the support component comprises a concave surface, and the contact assembly comprises a convex surface configured to complement the concave surface of the support component, and the concave surface of the support component receives the convex surface of the contact assembly.

In some embodiments, the support component comprises a mounting recess, and the contact assembly comprises a mounting protrusion, and wherein the mounting protrusion of the contact assembly is positioned within a mounting recess of the support component.

In some embodiments, the charge coil comprises at least one wire formed into a plurality of substantially concentric and substantially coplanar wire loops. In some embodiments, the support component is configured to support the form of the wire loops of the charge coil.

In some embodiments, the support component comprises a support body and a flange, and wherein the flange extends substantially around a perimeter of the support body. In some embodiments, the flange is configured to support the position of the charge coil on the support component.

In some embodiments, the support component further comprises a cavity extending through the support body. In some embodiments, the device further comprises a footer coupled to the body of the device, wherein the footer comprises a communication antenna, and a support core configured to support the communication antenna.

In some embodiments, the communication antenna comprises at least one wire formed into a wire loop. In some embodiments, the support core is configured to support the form of the wire loop of the communication antenna.

According to another aspect of the present technology, there is provided a method of manufacturing an implantable neural stimulation device. The device comprises a body to contain stimulation electronics and battery, a header comprising a charge coil, and at least one contact assembly to deliver stimulation energy from the battery under the control of stimulation electronics. The method comprises forming the body with at least one lid, wherein the lid includes at least one feedthrough, attaching the lid to the body to seal the stimulation electronics and battery inside the body and forming the at least one contact assembly. The method further comprises forming the charge coil, forming a support component, positioning the charge coil to be supported by the support component, and positioning the support component to be supported by the contact assembly. The method further comprises electrically coupling the contact assembly to the stimulation electronics via at least one wire extending through the at least one feedthrough of the lid, and encasing at least the header in an encasing material.

In some embodiments, the encasing material isolates the support component from the lid. In some embodiments, the contact assembly comprises at least one mounting protrusion, and the support component comprises at least one mounting recess, and the step of positioning the support component to be supported by the contact assembly comprises inserting the mounting protrusion in the mounting recess.

In some embodiments, the contact assembly comprises at least one curved surface, and the support component comprises at least one complementary curved surface configured to abut the curved surface of the contact assembly, and the step of positioning the support component to be supported by the contact assembly comprises abutting the curved surface of the contact assembly with the complementary curved surface of the support component.

In some embodiments, the contact assembly comprises a first contact assembly and a second contact assembly, and a cavity between the first contact assembly and the second contact assembly, and the support component comprises a mounting protrusion configured to fit within the cavity between the first contact assembly and the second contact assembly, and the step of positioning the support component to be supported by the contact assembly comprises positioning the mounting protrusion of the support component in the cavity between the first contact assembly and the second contact assembly.

In some embodiments, the step of positioning the support component to be supported by the contact assembly comprises adhering the support component to the contact assembly with adhesive.

References herein to estimation, determination, comparison and the like are to be understood as referring to an automated process carried out on data by a processor operating to execute a predefined procedure suitable to effect the described estimation, determination and/or comparison step(s). The technology disclosed herein may be implemented in hardware (e.g., using digital signal processors, application specific integrated circuits (ASICs) or field programmable gate arrays (FPGAs)), or in software (e.g., using instructions tangibly stored on non-transitory computer-readable media for causing a data processing system to perform the steps described herein), or in a combination of hardware and software. The disclosed technology can also be embodied as computer-readable code on a computer-readable medium. The computer-readable medium can include any data storage device that can store data which can thereafter be read by a computer system. Examples of the computer-readable medium include read-only memory ("ROM"), random-access memory ("RAM"), magnetic tape, optical data storage devices, flash storage devices, or any other suitable storage devices. The computer-readable medium can also be distributed over network-coupled computer systems so that the computer-readable code is stored and/or executed in a distributed fashion.

BRIEF DESCRIPTION OF THE DRAWINGS

One or more implementations of the invention will now be described with reference to the accompanying drawings, in which.

DETAILED DESCRIPTION OF THE PRESENT TECHNOLOGY

Figure 1:
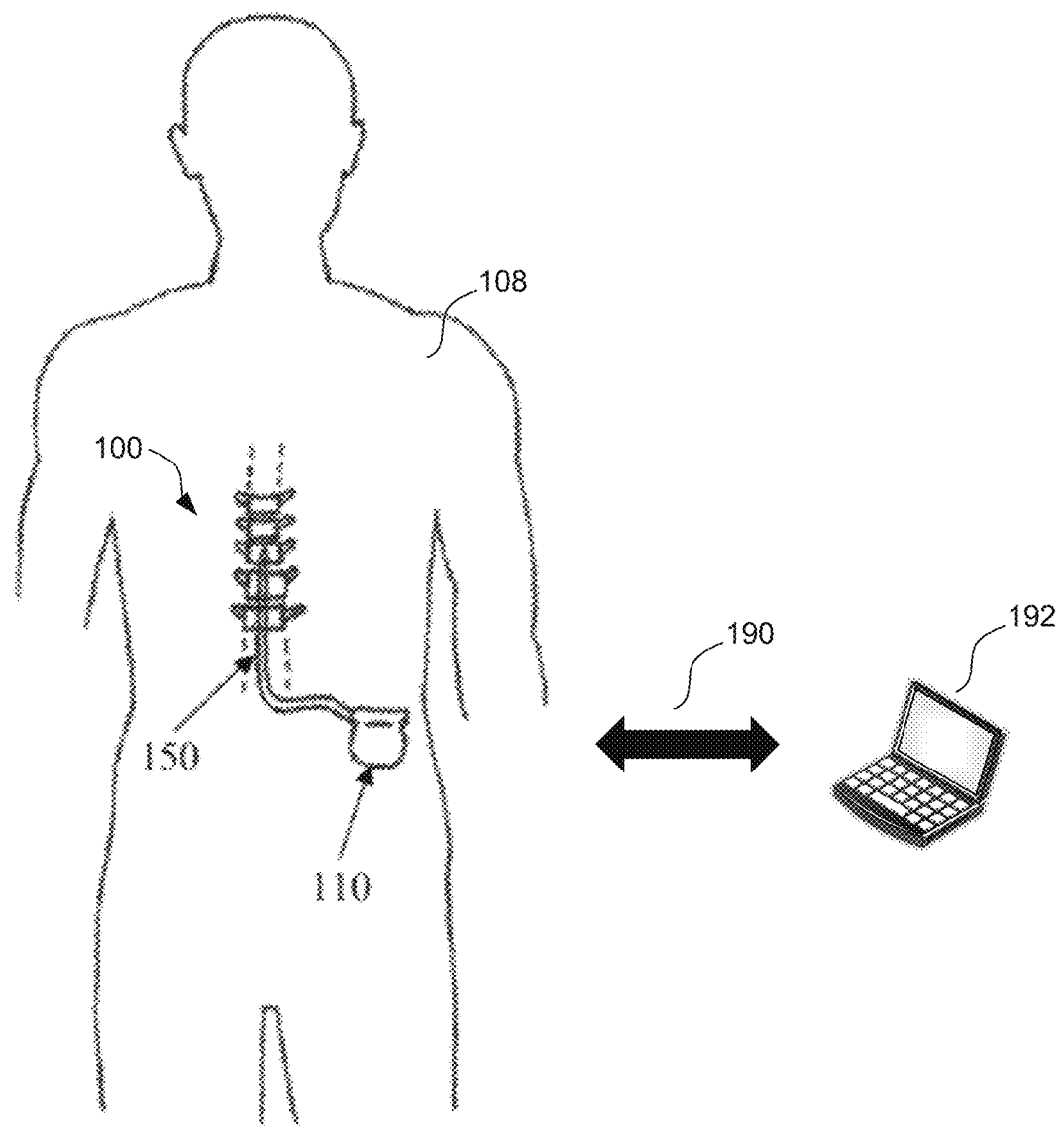
FIG. 1 schematically illustrates an implanted spinal cord stimulator, according to an implementation of the present technology.

FIG. 1—Implanted Stimulator in Patient

FIG. 1 schematically illustrates an implanted spinal cord stimulator 100 in a patient 108, according to an implementation of the present technology. Stimulator 100 comprises an electronics module 110 implanted at a suitable location. In one implementation, stimulator 100 is implanted in the patient's lower abdominal area or posterior superior gluteal region. In other implementations, the electronics module 110 is implanted in other locations, such as a flank or sub-clavicular. Stimulator 100 further comprises an electrode array 150 implanted within the epidural space and connected to the module 110 by a suitable lead. The electrode array 150 may comprise one or more electrodes such as electrode pads on a paddle lead, circular (e.g., ring) electrodes surrounding the body of the lead, conformable electrodes, cuff electrodes, segmented electrodes, or any other type of electrodes capable of forming unipolar, bipolar or multipolar electrode configurations for stimulation and measurement. The electrodes may pierce or affix directly to the tissue itself.

Numerous aspects of the operation of implanted stimulator 100 may be programmable by an external computing device 192, which may be operable by a user such as a clinician or the patient 108. Moreover, implanted stimulator 100 serves a data gathering role, with gathered data being communicated to external device 192 via a transcutaneous communications channel 190. Communications channel 190 may be active on a substantially continuous basis, at periodic intervals, at non-periodic intervals, or upon request from the external device 192. External device 192 may thus provide a clinical interface configured to program the implanted stimulator 100 and recover data stored on the implanted stimulator 100. This configuration is achieved by program instructions collectively referred to as the Clinical Programming Application (CPA) and stored in an instruction memory of the clinical interface.

Figure 2:
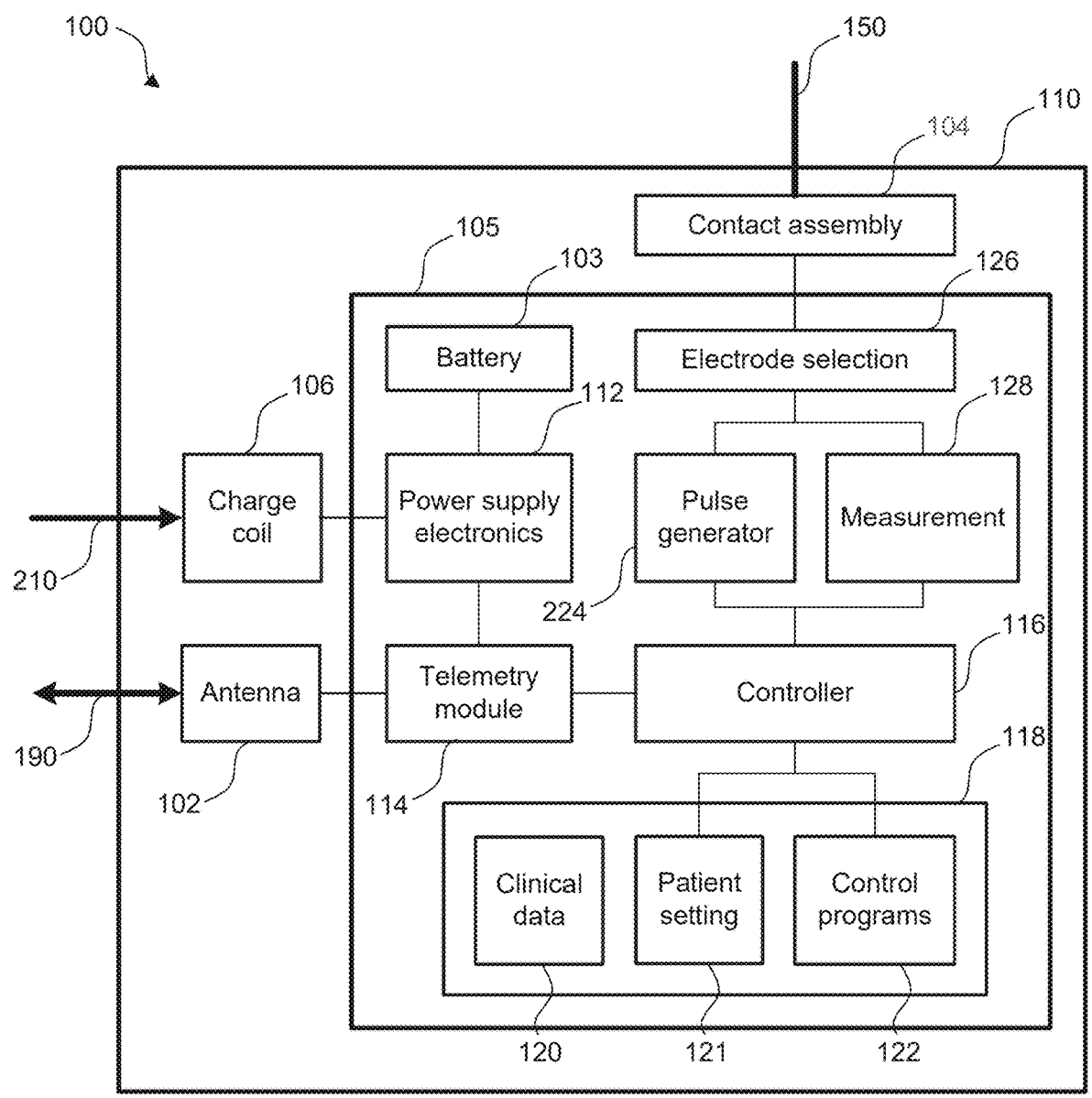
FIG. 2 is a block diagram of the stimulator of FIG. 1.

FIG. 2—Block Diagram of Stimulator

FIG. 2 is a block diagram of the stimulator 100. The stimulator 100 comprises an electronics module 110 includes a body 105, which is formed of at least a shell and a lid, as detailed below. The electronics module 110 further includes a charge coil 106, a communications antenna 102 and a contact assembly 104, which may all be positioned within one or more headers coupled to the body of the electronics module 110.

The electronics module 110 further comprises a telemetry module 114. In implementations of the present technology, any suitable type of transcutaneous communication, such as infrared (IR), radiofrequency (RF), capacitive and inductive transfer, may be used by telemetry module 114 to transfer data to and from the electronics module 110 via communications channel 190. Module controller 116 has an associated memory 118 storing one or more of clinical data 120, patient settings 121, control programs 122, and the like. Controller 116 controls a pulse generator 124 to generate stimuli, such as in the form of electrical pulses, in accordance with the patient settings 121 and control programs 122. Electrode selection module 126 switches the generated pulses to the selected electrode(s) of electrode array 150, for delivery of the pulses to the tissue surrounding the selected electrode(s). Measurement circuitry 128, which may comprise an amplifier and/or an analog-to-digital converter (ADC), is configured to process measurements of neural responses sensed at measurement electrode(s) of the electrode array 150 as selected by electrode selection module 126.

The electronics module 110 further comprises power supply electronics 112 which are connected to a rechargeable battery 103. The battery 103 is configured to provide power to the components of the electronics module 110, including the contact assembly, so that stimulation energy can be produced by the stimulator 100. In implementations of the present technology, the charge coil 106 generates electrical charge, through transcutaneous inductive transfer via wireless channel 210, to charge battery 103.

In some implementations of the present technology, a single component performs the function of the charge coil as well as the communication antenna.

Figure 3:
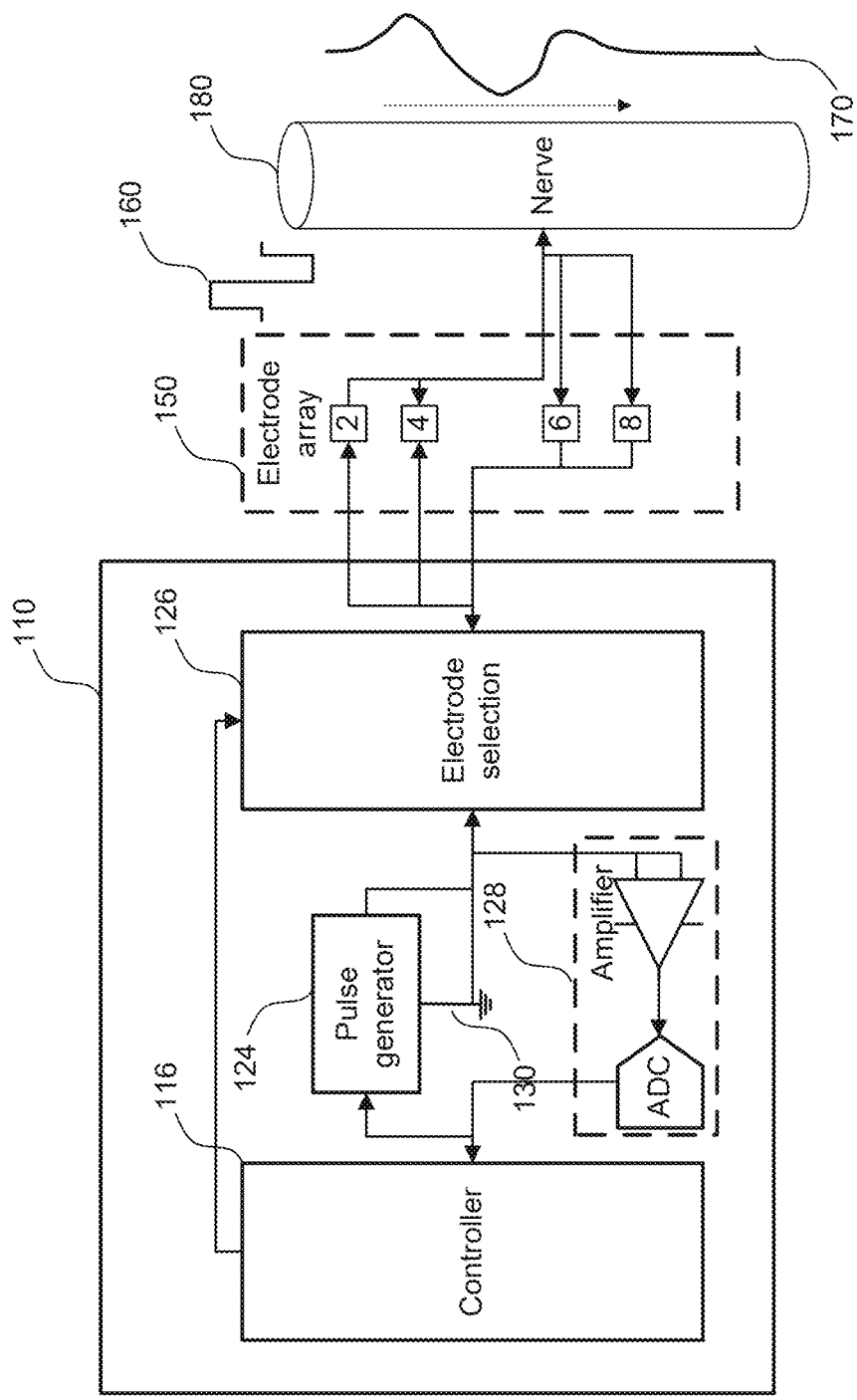
FIG. 3 is a schematic illustrating interaction of the implanted stimulator of FIG. 1 with a nerve.

FIG. 3—Interaction of Implanted Stimulator

FIG. 3 is a schematic illustrating interaction of the implanted stimulator 100 with a nerve 180 in the patient 108. In the implementation illustrated in FIG. 3 the nerve 180 may be located in the spinal cord. In alternative implementations the stimulator 100 may be positioned adjacent any desired neural tissue including a peripheral nerve, visceral nerve, parasympathetic nerve or a brain structure. Electrode selection module 126 selects a stimulus electrode 2 of electrode array 150 through which to deliver a pulse from the pulse generator 124. A pulse may comprise one or more phases, e.g. a biphasic stimulus pulse 160 comprises two phases. The electrode selection module 126 selects a stimulus electrode 2 to deliver the pulse to surrounding tissue including nerve 180. Electrode selection module 126 also selects a return electrode 4 of the electrode array 150 for stimulus charge recovery in each phase, to maintain a zero net charge transfer. The use of two electrodes in this manner for delivering and recovering current in each stimulus phase is referred to as bipolar stimulation. Alternative implementations may apply other forms of bipolar stimulation, or may use a greater number of stimulus electrodes. Electrode selection module 126 is illustrated in FIG. 3 as connecting to a ground 130 of the pulse generator 124 to enable stimulus charge recovery via the return electrode 4. In other implementations, other connections for charge recovery may be used.

Delivery of an appropriate stimulus from stimulus electrodes 2 and 4 to the nerve 180 evokes a neural response comprising an evoked compound action potential 170 (ECAP) which will propagate along the nerve 180 as illustrated, for therapeutic purposes, which in the case of a spinal cord stimulator for chronic pain may be to create paraesthesia at a desired location. To this end, the stimulus electrodes 2 and 4 are used to deliver stimuli periodically at any therapeutically suitable frequency, for example 30 Hz, although other frequencies may be used including frequencies as high as the kHz range. In alternative implementations, stimuli may be delivered in a non-periodic manner such as in bursts, or sporadically, as appropriate for the patient 108. To "fit" the stimulator 100 to the patient 108, a clinician may cause the stimulator 100 to deliver stimuli of various configurations which seek to produce a sensation that is experienced by the user as paraesthesia. When a stimulus configuration is found which evokes paraesthesia in a location and of a size which is congruent with the area of the patient's body affected by pain, the clinician nominates that configuration for ongoing use.

Figure 4:
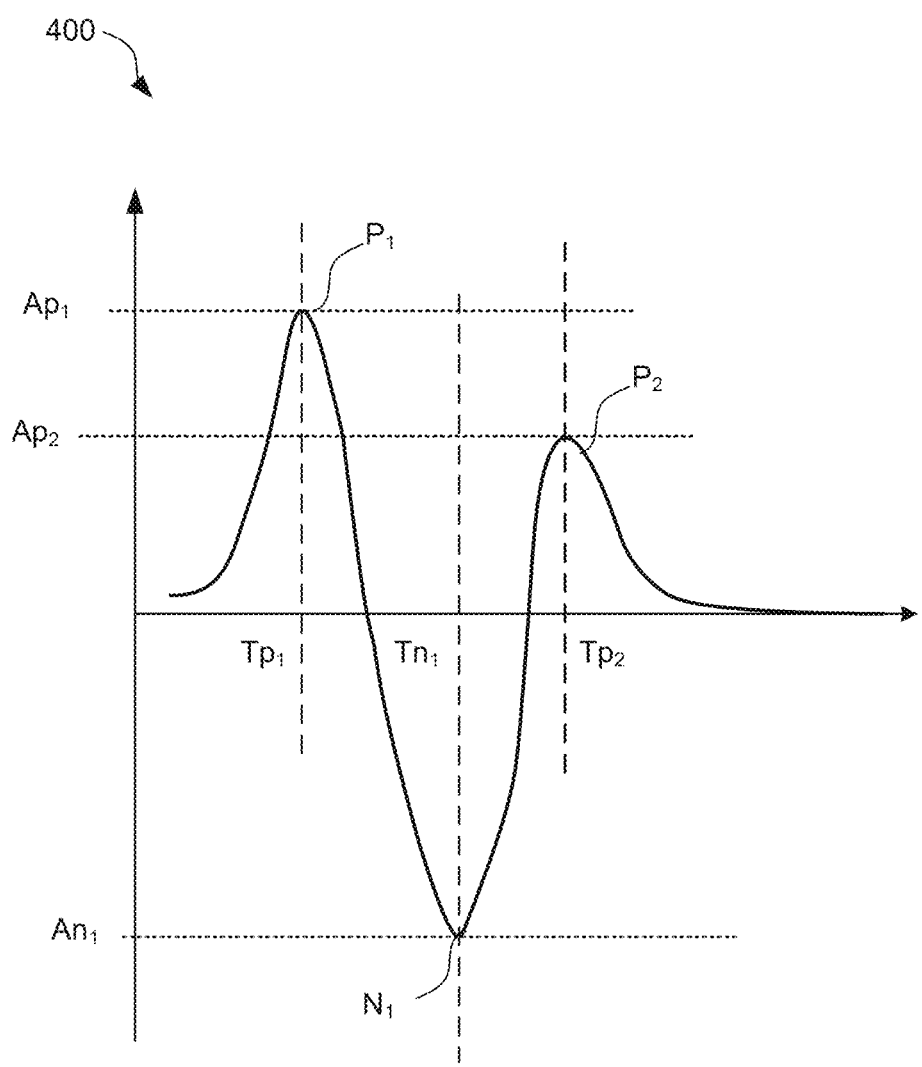
FIG. 4 illustrates the typical form of an electrically evoked compound action potential (ECAP) of a healthy subject.

FIG. 4—A Form of an ECAP

FIG. 4 illustrates the typical form 400 of an empirically derived ECAP response profile of a healthy subject, as recorded at a single measurement electrode referenced to the system ground 130. The shape and duration of the ECAP 400 shown in FIG. 4 is predictable because it is a result of the ion currents produced by the ensemble of fibres depolarising and generating action potentials (APs) in response to stimulation. The evoked action potentials (EAPs) generated synchronously among a large number of fibres sum to form the ECAP 400. The propagation velocity of the AP on each fibre is determined largely by the diameter of that fibre. The ECAP 400 generated from the synchronous depolarisation of a group of similar fibres comprises a positive peak P1, then a negative peak N1, followed by a second positive peak P2. This shape is caused by the region of activation passing the measurement electrode as the action potentials propagate along the individual fibres.

The ECAP may be recorded differentially using two measurement electrodes, as illustrated in FIG. 3. Depending on the polarity of recording, a differential ECAP may take an inverse form to that shown in FIG. 4, i.e. a form having two negative peaks N1 and N2, and one positive peak P1. Alternatively, depending on the distance between the two measurement electrodes, a differential ECAP may resemble the time derivative of the form 400, or more generally the difference between the form 400 and a time-delayed copy thereof.

The ECAP 400 may be parametrised by any suitable parameter(s) of which some are indicated in FIG. 4. The amplitude of the positive peak P1 is $Ap_1$ and occurs at time $Tp_1$. The amplitude of the positive peak P2 is $Ap_2$ and occurs at time $Tp_2$. The amplitude of the negative peak P1 is $An_1$ and occurs at time $Tn_1$. The peak-to-peak amplitude is $Ap_1+An_1$. A recorded ECAP will typically have a maximum peak-to-peak amplitude in the range of microvolts and a duration of 2 to 3 ms.

The stimulator 100 is further configured to sense the existence and intensity of ECAPs 170 propagating along nerve 180, whether such ECAPs are evoked by the stimulus from electrodes 2 and 4, or otherwise evoked. To this end, any electrodes of the array 150 may be selected by the electrode selection module 126 to serve as measurement electrode 6 and measurement reference electrode 8, whereby the electrode selection module 126 selectively connects the chosen electrodes to the inputs of the measurement circuitry 128. Thus, signals sensed by the measurement electrodes 6 and 8 are passed to the measurement circuitry 128, which may comprise an amplifier and an analog-to-digital converter (ADC). The measurement circuitry 128 for example may operate in accordance with the teachings of International Patent Application Publication No. WO2012155183 by the present applicant, the content of which is incorporated herein by reference.

Neural responses obtained from the measurement electrodes 6, 8 via measurement circuitry 128 are processed by controller 116 to obtain information regarding the effect of the applied stimulus upon the nerve 180. In some implementations, neural responses are processed by controller 116 in a manner which extracts and stores one or more parameters from each response or group of responses. In one such implementation, the parameter comprises a peak-to-peak ECAP amplitude in microvolts (μV). For example, the neural responses may be processed to determine the peak-to-peak ECAP amplitude in accordance with the teachings of International Patent Publication No. WO 2015/074121, the contents of which are incorporated herein by reference. Alternative implementations may extract and store an alternative parameter from the response to be stored, or may extract and store two or more parameters from the response.

Stimulator 100 applies stimuli over a potentially long period such as days, weeks, or months and during this time may store parameters of neural responses, stimulation settings, paraesthesia target level, and other operational parameters in memory 118. To effect suitable SCS therapy, stimulator 100 may deliver tens, hundreds or even thousands of stimuli per second, for many hours each day. Each neural response or group of responses generates one or more parameters such as a measure of the amplitude of the neural response. Stimulator 100 thus may produce such data at a rate of tens or hundreds of Hz, or even kHz, and over the course of hours or days this process results in large amounts of clinical data which may be stored in the clinical data store 120 of memory 118. Memory 118 is however necessarily of limited capacity and care is thus required to select compact data forms for storage into the memory 118, to ensure that the memory 118 is not exhausted before such time that the data is expected to be retrieved wirelessly by external device 192, which may occur only once or twice a day, or less.

Figure 5:
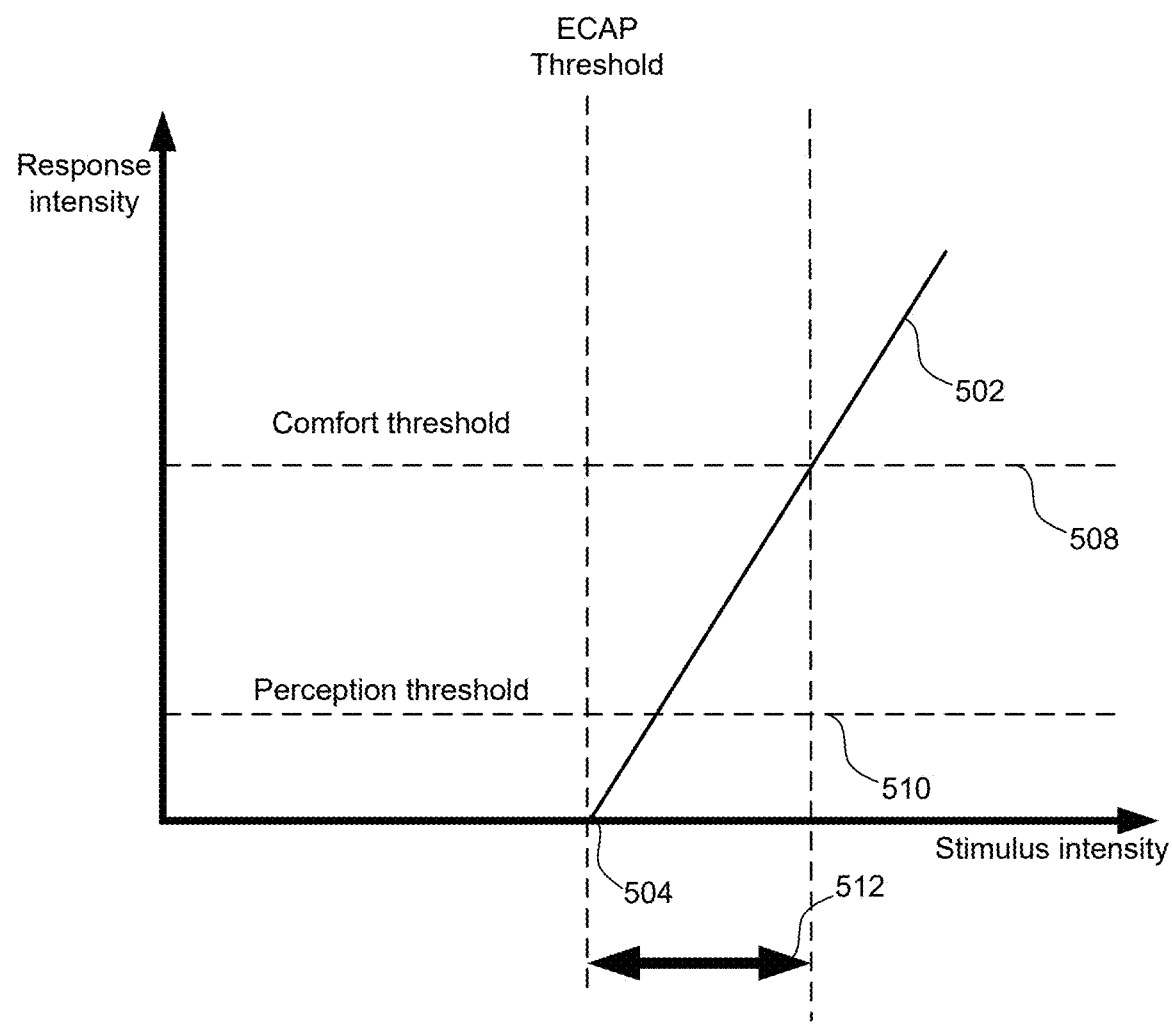
FIG. 5 illustrates an idealised activation plot for one posture of a patient undergoing neuromodulation.

FIG. 5—Activation Plot

An activation plot, or growth curve, is an approximation to the relationship between stimulus intensity (e.g. an amplitude of the current pulse 160) and intensity of neural response 170 resulting from the stimulus (e.g. an ECAP amplitude). FIG. 5 illustrates a linearized activation plot 502 for one posture of the patient 108. The activation plot 502 shows a linearly increasing ECAP amplitude for stimulus amplitude values above a threshold 504, referred to as the ECAP threshold. The ECAP threshold 504 exists because of the binary nature of fibre recruitment; if the field strength is too low, no fibres will be recruited. However, once the field strength exceeds a threshold, fibres begin to be recruited, and their individual evoked action potentials are independent of the strength of the field. The ECAP threshold 504 therefore reflects the field strength at which significant numbers of fibres begin to be recruited, and the increase in response intensity with stimulus amplitude above the ECAP threshold reflects increasing numbers of fibres being recruited. Below the ECAP threshold 504, the ECAP amplitude may be taken to be zero. Above the ECAP threshold 504, the activation plot 502 has a positive, approximately constant slope indicating a linear relationship between stimulus amplitude and the ECAP amplitude. Such a relationship may be modelled as:

$$y = \begin{cases} S(s-T), & s \geq T \\ 0, & s < T \end{cases} \quad (1)$$

where s is the stimulus amplitude, y is the ECAP amplitude, T is the ECAP threshold and S is the slope of the activation plot (referred to herein as the patient sensitivity). The slope S and the ECAP threshold T are the key parameters of the activation plot 502.

FIG. 5 also illustrates a comfort threshold 508, which is an ECAP amplitude above which the patient 108 experiences uncomfortable or painful stimulation. FIG. 5 also illustrates a perception threshold 510. The perception threshold 510 corresponds to an ECAP amplitude that is perceivable by the patient. There are a number of factors which can influence the position of the perception threshold 510, including the posture of the patient. Perception threshold 510 may correspond to a stimulus amplitude that is greater than the ECAP threshold 504, as illustrated in FIG. 5, if patient 108 does not perceive low levels of neural activation. Conversely, the perception threshold 510 may correspond to a stimulus amplitude that is less than the ECAP threshold 504, if the patient has a high perception sensitivity to lower levels of neural activation than can be detected in an ECAP, or if the signal to noise ratio of the ECAP is low.

For effective and comfortable operation of an implantable neuromodulation device such as the stimulator 100, it is desirable to maintain stimulus amplitude within a therapeutic range. A stimulus amplitude within a therapeutic range is above the ECAP threshold 504 and evokes an ECAP amplitude that is below the comfort threshold 508. In principle, it would be straightforward to measure these limits and ensure that stimulus amplitude, which may be closely controlled, always falls within the therapeutic range 512. However, the activation plot, and therefore the therapeutic range 512, varies with the posture of the patient 108.

Figure 6:
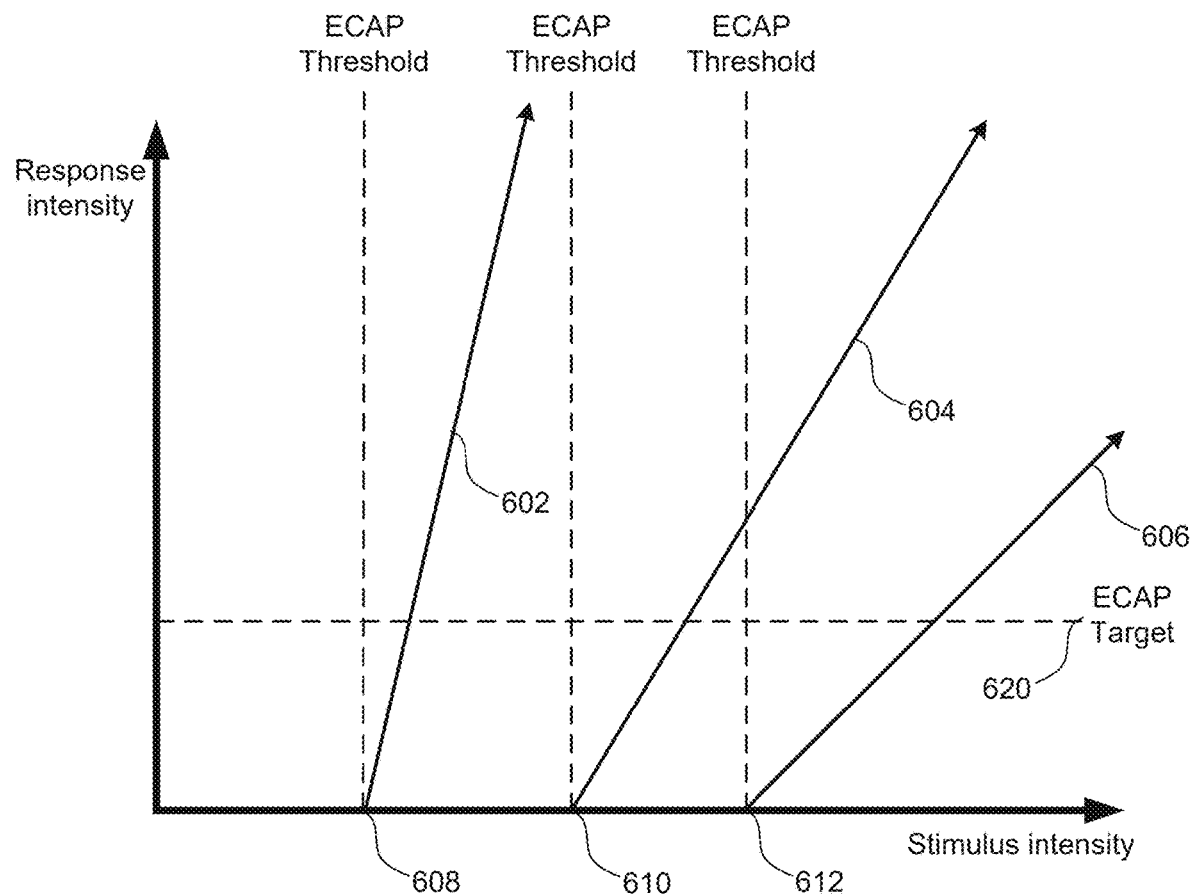
FIG. 6 illustrates the variation in the activation plots with changing posture of the patient.

FIG. 6—Variation in Activation Plots with Changing Posture

FIG. 6 illustrates the variation in the activation plots with changing posture of the patient. A change in posture of the patient may cause a change in impedance of the electrode-tissue interface or a change in the distance between electrodes and the neurons. While the activation plots for only three postures, 602, 604 and 606, are shown in FIG. 6, the activation plot for any given posture can lie between or outside the activation plots shown, on a continuously varying basis depending on posture. Consequently, as the patient's posture changes, the ECAP threshold changes, as indicated by the ECAP thresholds 608, 610 and 612 for the respective activation plots 602, 604, and 606. Additionally, as the patient's posture changes, the slope of the activation plot also changes, as indicated by the varying slopes of activation plots 602, 604 and 606. In general, as the distance between the stimulus electrodes and the spinal cord increases, the ECAP threshold increases and the slope of the activation plot decreases. The activation plots 602, 604, and 606 therefore correspond to increasing distance between stimulus electrodes and spinal cord, and decreasing patient sensitivity.

To keep the applied stimulus intensity within the therapeutic range as patient posture varies, in some implementations an implantable neuromodulation device such as the stimulator 100 may adjust the applied stimulus amplitude based on a feedback variable that is determined from one or more extracted ECAP parameters. In one implementation, the device may adjust the stimulus amplitude to maintain the extracted ECAP amplitude at a target response intensity. For example, the device may calculate an error between a target ECAP value and a measured ECAP amplitude, and adjust the applied stimulus intensity to reduce the error as much as possible, such as by adding the scaled error to the current stimulus intensity. A neuromodulation device that operates by adjusting the applied stimulus intensity based on an extracted ECAP parameter is said to be operating in closed loop mode and will also be referred to as a closed loop neural stimulus (CLNS) device. By adjusting the applied stimulus intensity to maintain the extracted ECAP amplitude at an appropriate target response intensity, such as an ECAP target 620 illustrated in FIG. 6, a CLNS device will generally keep the stimulus intensity within the therapeutic range as patient posture varies.

A CLNS device comprises a stimulator that takes a stimulus intensity value and converts it into a neural stimulus comprising a sequence of electrical pulses according to a predefined stimulation pattern. The stimulation pattern is characterised by multiple parameters including stimulus intensity (amplitude), pulse width, number of phases, order of phases, number of stimulus electrode poles (two for bipolar, three for tripolar etc.), and stimulus rate or frequency. At least one of the stimulus parameters, usually the stimulus intensity, is controlled by the feedback loop.

In an example CLNS system, a user (e.g. the patient or a clinician) sets a target neural response value, and the CLNS performs proportional-integral-differential (PID) control. In some implementations, the differential contribution is disregarded and the CLNS system uses a first order integrating feedback loop. The stimulator produces stimulus in accordance with a stimulus intensity parameter, which evokes a neural response in the patient. The evoked neural response (e.g. an ECAP) is detected and its amplitude measured by the CLNS and compared to the target neural response value.

The measured neural response amplitude, and its deviation from the target neural response value, is used by the feedback loop to determine possible adjustments to the stimulus intensity parameter to maintain the neural response at the target value. If the target value is properly chosen, the patient receives consistently comfortable and therapeutic stimulation through posture changes and other perturbations to the stimulus/response behaviour.

FIG. 7—CLNS System

Figure 7:
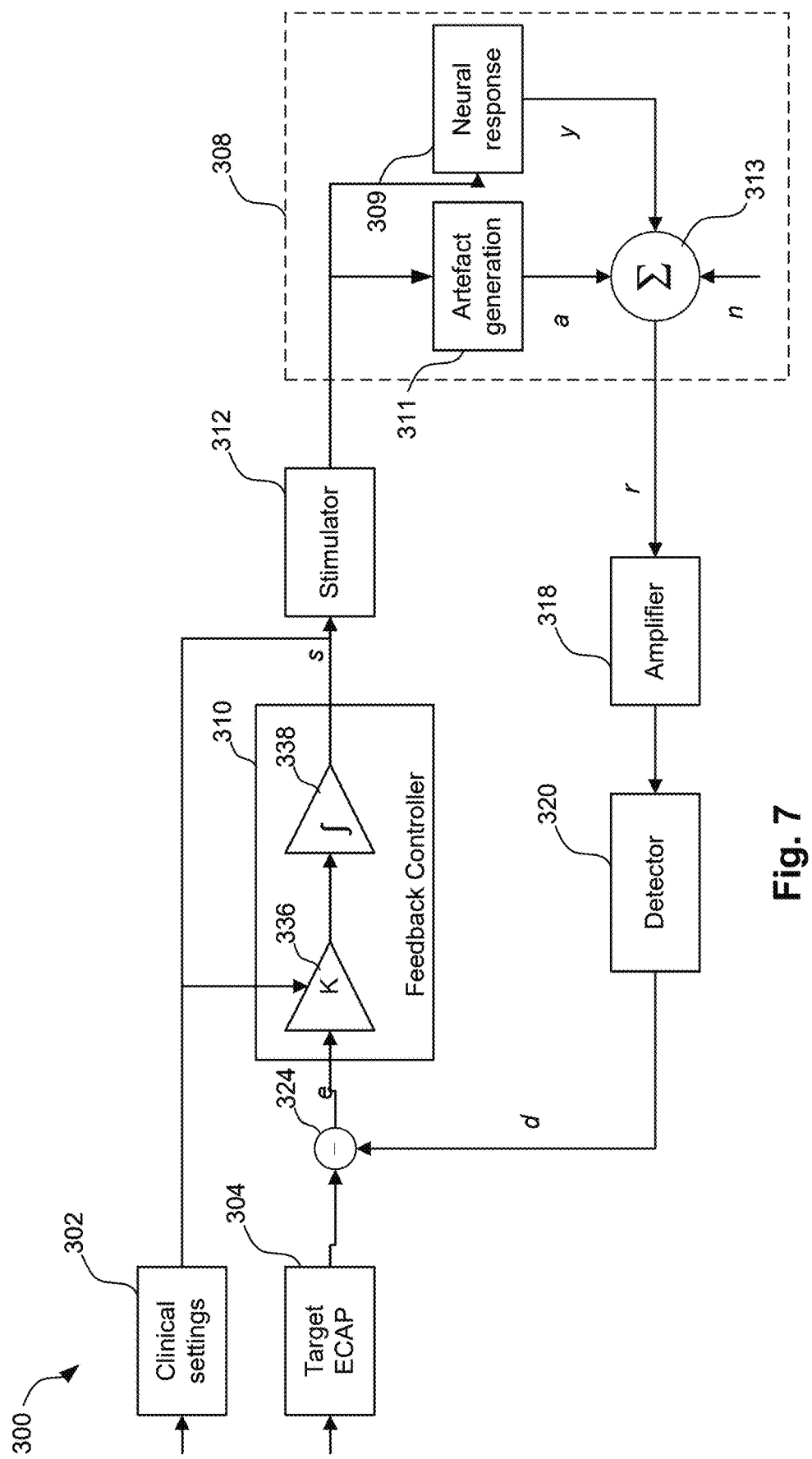
FIG. 7 is a schematic illustrating elements and inputs of a closed loop neuromodulation system, according to an implementation of the present technology.

FIG. 7 is a schematic illustrating elements and inputs of a closed loop neuromodulation system 300, according to an implementation of the present technology. The system 300 comprises a stimulator 312 which converts a stimulus intensity parameter (for example a stimulus current value) s, in accordance with a set of predefined stimulus parameters, to a neural stimulus comprising a sequence of electrical pulses on the stimulus electrodes (not shown in FIG. 5). According to an implementation, the predefined stimulus parameters comprise the number and order of phases, the number of stimulus electrode poles, the pulse width, and the stimulus rate or frequency.

The generated stimulus crosses from the electrodes to the spinal cord, which is represented in FIG. 7 by the dashed box 308. The box 309 represents the evocation of a neural response y by the stimulus as described above. The box 311 represents the evocation of an artefact signal a, which is dependent on stimulus intensity and other stimulus parameters, as well as the electrical environment of the measurement electrode. Various sources of noise n may add to the evoked response y at the summing element 313 before the evoked response is measured, including electrical noise from external sources such as 50 Hz mains power; electrical disturbances produced by the body such as neural responses evoked not by the device but by other causes such as peripheral sensory input, EGG, EMG; and electrical noise from amplifier 318.

The neural recruitment arising from the stimulus is affected by mechanical changes, including posture changes, walking, breathing, heartbeat and so on. Mechanical changes may cause impedance changes, or changes in the location and orientation of the nerve fibres relative to the electrode array(s). As described above, the intensity of the evoked response provides a measure of the recruitment of the fibres being stimulated. In general, the more intense the stimulus, the more recruitment and the more intense the evoked response. An evoked response typically has a maximum amplitude in the range of microvolts, whereas the applied stimulus to evoke the response is typically several volts.

The total response signal r (including evoked neural response, artefact, and noise) is amplified by the signal amplifier 318 and then measured by the detector 320. The detector 320 outputs a measured response intensity d. In one implementation, the neural response intensity comprises an ECAP value. The measured response intensity d is then compared to a target ECAP value (set by the target ECAP controller 304) by the comparator 324 to produce an error value e. The error value e is input into the feedback controller 310.

The comparator 324 compares the ECAP value of the total response signal r to the target ECAP value as set by the target ECAP controller 304 and provides an indication of the difference between the ECAP value of the total response signal r and the target ECAP value to the feedback controller 310. This difference is the error value, e.

The feedback controller 310 calculates an adjusted stimulus intensity parameter, s, with the aim of maintaining a measured response intensity d equal to the target ECAP value. Accordingly, the feedback controller 310 adjusts the stimulus intensity parameter s to minimise the error value, e. In one implementation, the controller 310 utilises a first order integrating function, using a gain element 336 and an integrator 338, in order to provide suitable adjustment to the stimulus intensity parameter s. According to such an implementation, an adjustment δs to the current stimulus intensity parameter s may be computed by the feedback controller 310 as:

$$\delta s = \int K e \, dt \qquad (2)$$

A target ECAP value is input to the comparator 324 via the target ECAP controller 304. In one implementation, the target ECAP controller 304 provides an indication of a specific target ECAP value. In another implementation, the target ECAP controller 304 provides an indication to increase or to decrease the present target ECAP value. The target ECAP controller 304 may comprise an input into the neural stimulus device, via which the patient or clinician can input a target ECAP value, or indication thereof. The target ECAP controller 304 may comprise memory in which the target ECAP value is stored, and provided to the comparator 324.

A clinical settings controller 302 provides clinical parameters to the system, including the gain K for the gain controller 336 and the stimulation parameters for the stimulator 312. The clinical settings controller 302 may be configured to adjust the gain value, K, of the gain controller 336 to adapt the feedback loop to patient sensitivity. The clinical settings controller 302 may comprise an input into the neural stimulus device, via which the patient or clinician can adjust the clinical settings. The clinical settings controller 302 may comprise memory in which the clinical settings are stored, and are provided to components of the system 300.

In some implementations, two clocks (not shown) are used, being a stimulus clock operating at the stimulus frequency (e.g. 60 Hz) and a sample clock for sampling the measured response r (for example, operating at 10 kHz). As the detector 320 is linear, only the stimulus clock affects the dynamics of the CLNS 300. On the next stimulus clock cycle, the stimulator 312 outputs a stimulus in accordance with the adjusted stimulus intensity s. Accordingly, there is a delay of one stimulus clock cycle before the stimulus is updated in light of the error value e.

Figure 8:
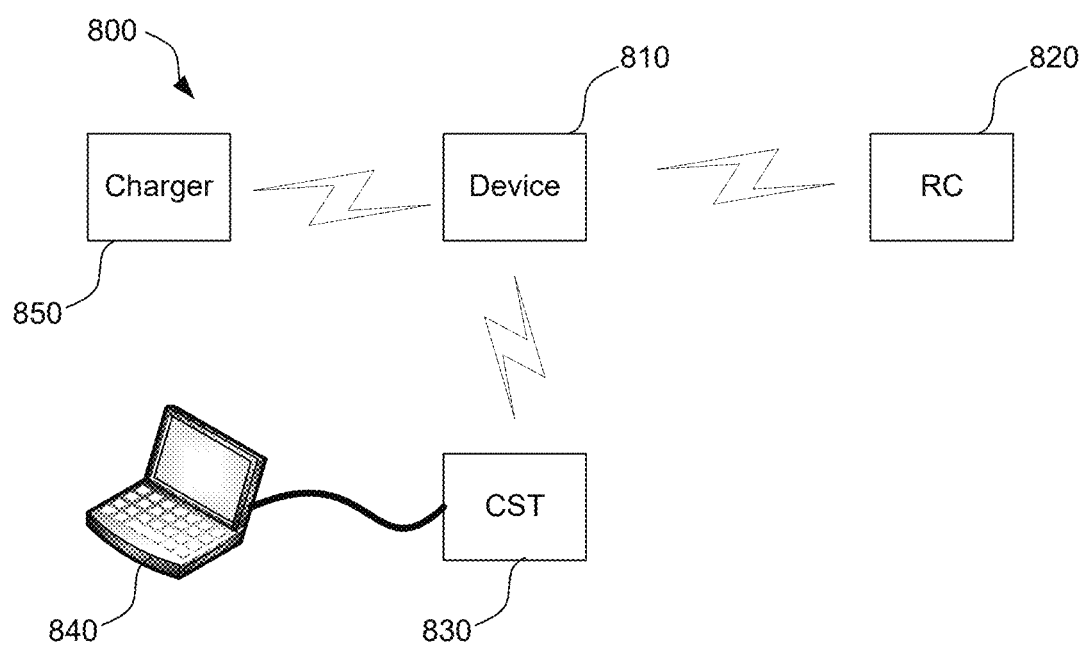
FIG. 8 is a block diagram of a neuromodulation therapy system including the implanted stimulator of FIG. 1 according to an implementation of the present technology.

FIG. 8—Neuromodulation System

FIG. 8 is a block diagram of a neuromodulation system 800. The neuromodulation system 800 is centred on a neuromodulation device 810. In one example, the neuromodulation device 810 may be implemented as the stimulator 100 of FIG. 1, implanted within a patient (not shown). The neuromodulation device 810 is connected wirelessly to a remote controller (RC) 820. The remote controller 820 is a portable computing device that provides the patient with control of their stimulation in the home environment by allowing control of the functionality of the neuromodulation device 810, including one or more of the following functions: enabling or disabling stimulation; adjustment of stimulation intensity; and selection of a stimulation control program from the control programs stored on the neuromodulation device 810.

The charger 850 is configured to recharge a rechargeable power source of the neuromodulation device 810. The recharging is illustrated as wireless in FIG. 8 but may be wired in alternative implementations.

The neuromodulation device 810 is wirelessly connected to a Clinical System Transceiver (CST) 830. The wireless connection may be implemented as the transcutaneous communications channel 190 of FIG. 1. The CST 830 acts as an intermediary between the neuromodulation device 810 and the Clinical Interface (CI) 840, to which the CST 830 is connected. A wired connection is shown in FIG. 8, but in other implementations, the connection between the CST 830 and the CI 840 is wireless.

The clinical interface 840 may be implemented as the external computing device 192 of FIG. 1. The CI 840 is configured to program the neuromodulation device 810 and recover data stored on the neuromodulation device 810. This configuration is achieved by program instructions collectively referred to as the Clinical Programming Application (CPA) and stored in an instruction memory of the clinical interface 840.

Figure 9:
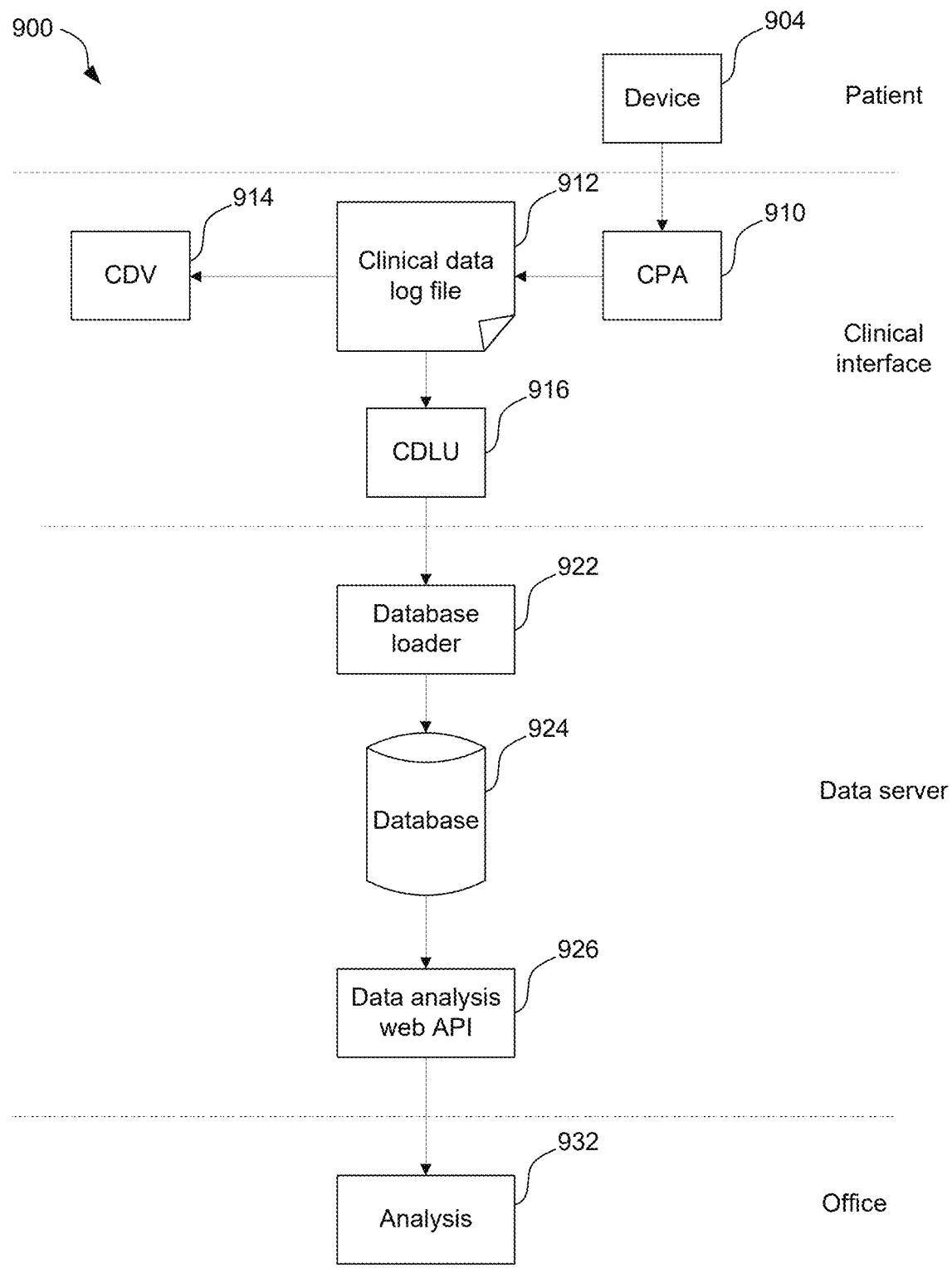
FIG. 9 is a block diagram illustrating the data flow of a neuromodulation therapy system such as the system of FIG. 8.

FIG. 9—Data Flow of Neuromodulation Therapy System

FIG. 9 is a block diagram illustrating the data flow 900 of a neuromodulation therapy system such as the system 800 of FIG. 8, according to an implementation of the present technology. Neuromodulation device 904, once implanted within a patient, applies stimuli over a potentially long period such as weeks or months and records neural responses, stimulation settings, paraesthesia target level, and other operational parameters, discussed further below. Neuromodulation device 904 may comprise a Closed Loop Stimulator (CLS), in that the recorded neural responses are used in a feedback arrangement to control stimulation settings on a continuous or ongoing basis. To effect suitable SCS therapy, neuromodulation device 904 may deliver tens, hundreds or even thousands of stimuli per second, for many hours each day. The feedback loop may operate for most or all of this time, by obtaining neural response recordings following every stimulus, or at least obtaining such recordings regularly. Each recording generates a feedback variable such as a measure of the amplitude of the evoked neural response, which in turn results in the feedback loop changing the stimulation parameters for a following stimulus. Neuromodulation device 904 thus produces such data at a rate of tens or hundreds of Hz, or even kHz, and over the course of hours or days this process results in large amounts of clinical data. This is unlike past neuromodulation devices such as open-loop SCS devices which lack any ability to record any neural response.

When brought in range with a receiver, neuromodulation device 904 transmits data, e.g. via telemetry module 114, to a clinical programming application (CPA) 910 installed on a clinical interface. In one implementation, the clinical interface is the CI 840 of FIG. 8. The data can be grouped into two main sources: (1) data collected in real-time during a programming session; (2) data downloaded from a stimulator after a period of non-clinical use by a patient. CPA 910 collects and compiles the data into a clinical data log file 912.

All clinical data transmitted by the neuromodulation device 904 may be compressed by use of a suitable data compression technique before transmission by telemetry module 114 and/or before storage into the Clinical Data storage 120 to enable storage by neuromodulation device 904 of higher resolution data. This higher resolution allows neuromodulation device 904 to provide more data for post-analysis and more detailed data mining for events during use. Alternatively, compression enables faster transmission of standard-resolution clinical data.

The clinical data log file 912 is manipulated, analysed, and efficiently presented by a clinical data viewer (CDV) 914 for field diagnosis by a clinician, field clinical engineer (FCE) or the like. CDV 914 is a software application installed on the Clinical Interface (CI). In one implementation, CDV 914 opens one Clinical Data Log file 912 at a time. CDV 914 is intended to be used in the field to diagnose patient issues and optimise therapy for the patient. CDV 914 may be configured to provide the user or clinician with a summary of neuromodulation device usage, therapy output, and errors, in a simple single-view page immediately after log files are compiled upon device connection.

Clinical Data Uploader 916 is an application that runs in the background on the CI, that uploads files generated by the CPA 910, such as the clinical data log file 912, to a data server. Database Loader 922 is a service which runs on the data server and monitors the patient data folder for new files. When Clinical Data Log files are uploaded by Clinical Data Uploader 916, database loader 922 extracts the data from the file and loads the extracted data to Database 924.

The data server further contains a data analysis web API 926 which provides data for third-party analysis such as by the analysis module 932, located remotely from the data server. The ability to obtain, store, download and analyse large amounts of neuromodulation data means that the present technology can: improve patient outcomes in difficult conditions; enable faster, more cost effective and more accurate troubleshooting and patient status; and enable the gathering of statistics across patient populations for later analysis, with a view to diagnosing aetiologies and predicting patient outcomes.

Figure 10:
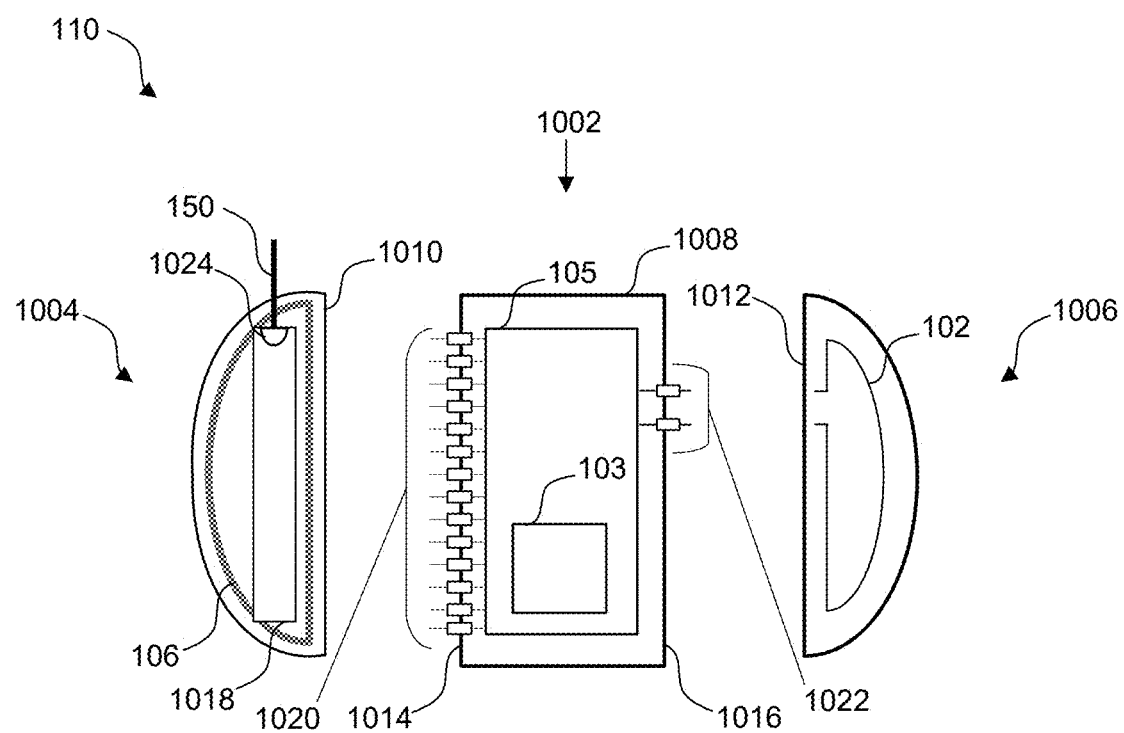
FIG. 10 illustrates an exploded representation of an electronics module of a neuromodulation device, according to an implementation of the present technology.

FIG. 10—Exploded View of Electronics Module 110

FIG. 10 illustrates an exploded representation of an electronics module 110 of a stimulation device 100, according to an implementation of the present technology. The electronics module 110 includes a body 1002, a header 1004 and a footer 1006. In other implementations of the present technology, the electronics module 110 may only comprise a body and a header, or the functionality and components of the footer may be included within the header such that the electronics module 110 does not comprise a footer.

The body 1002 comprises a shell 1008 that contains stimulation electronics 1005. An example of the stimulation electronics contained in the body 1002 is illustrated in FIG. 2. The stimulation electronics 1005 include power supply electronics 112 and a battery to control the stimulation device and provide stimulation energy. In some examples, components of the stimulation electronics may be mounted on one or more printed circuit boards.

According to the implementation of the technology as illustrated in FIG. 10, the shell 1008 is tubular in shape and has openings at the header end and at the footer end. The body 1002 is coupled to a lid 1014 which seals the header end of the shell 1008. The body further coupled to a base 1016 which seals the footer end of the shell 1008.

The representation of the electronics module 110 illustrated in FIG. 10 is an exploded representation. Accordingly, when assembled, the body 1002 of the electronics module 110 is coupled to the header 1004 such that the lid 1014 is in contact with the lower surface 1010 of the header. Similarly, when assembled, the body 1002 of the electronics module 110 is coupled to the footer 1006 such that the base 1016 is in contact with the upper surface 1012 of the header.

The lid 1014 includes a plurality of feedthroughs 1020 which provide for electrical communication between the components of the header 1004 and the stimulation electronics 1005. Similarly, the base 1016 includes a plurality of feedthroughs 1022 which provide for electrical communication between the components of the footer 1006 and the stimulation electronics.

In one implementation, the body 1002 is formed of titanium. In another example, the body 1002 may be comprised of a biocompatible ceramic. It is to be appreciated that other biocompatible materials may be used, including biograde stainless steels, biograde glass, silicon, alumina, zirconia, quartz, or metal alloys. The lid 1014 and the base 1016 may be coupled to the body 1002 with epoxy or welding to hermetically seal the body 1002.

Header and Charge Coil

The header 1004 comprises a contact assembly component 1018 connected to the stimulation lead 150. The contact assembly 1018 comprises a plurality of contacts, each of which is coupled to the stimulation electronics 1005 via one or more wires (not shown) passing through individual feedthroughs 1020 of the lid 1014. The contact assembly 1018, is coupled to the stimulation electronics 1005 to deliver the stimulation energy from the battery 107, under control by the stimulation electronics 1005. The contact assembly 1018 is further coupled to the stimulation lead 150, which is configured to deliver the stimulation energy to a specific site to target desired tissue. The stimulation lead 150 may be coupled to the contact assembly 1018 at an output terminal 1024.

The header 1004 further comprises a charge coil 106. In the assembled form of the electronics module 110, the charge coil 106 is electrically coupled to the battery 103 via electrical connections (e.g. wires or pins) passing through one or more feedthroughs 1020 of the lid 1014. The charge coil generates electrical charge, through transcutaneous inductive transfer, to charge battery 103. In one implementation, the charge coil 106 comprises a wire formed into one or more loops.

Footer and Communication Antenna

The electronics module 110 further comprises a footer 1006 coupled to the body 1002. In one implementation, the footer 1006 includes a communication antenna 102 configured to provide communication between the stimulation electronics 1005 and an external communication device 192, via transcutaneous communications channel 190. In some examples, the communication antenna 102 is a radio frequency (RF) coil. The external communication device 192 may be associated with a medical professional.

Sealing the Header and Footer

In one implementation, the contact assembly 1018 is physically coupled to the lid 1014 of the body 1002, by gluing, welding, or mechanical means. The contact assembly 1018 is electrically coupled to the stimulation electronics 1005 via the feedthroughs 1020. Furthermore, in one implementation, the components of the header 1004, including the charge coil 106 and the contact assembly 1018, are encased in a moldable or formable polymeric material, called polymeric encasing material, to hermetically seal the components of the header 1004. The encasing material may be epoxy, silicone or another biocompatible material suitable for encasing the header components and providing a hermetic seal. In some implementations, the encasing material couples some or all of the header components to the body of the electronics module 110.

Similarly, the communication antenna 102 is mounted to the base 1016 of the body 1002 and electrically coupled to the stimulation electronics 1005 via the feedthroughs 1022. In one implementation, the components of the footer 1006, including the communication antenna 102, are encased in the polymeric encasing material, to hermetically seal the components of the footer 1006.

Charge Coil

The form and position of the charge coil 106 can affect the efficiency and effectiveness of the generation of charging current, to charge the battery 103, from transcutaneous electromagnetic induction. Accordingly, for some implementations, it is desirable to include a support component which is configured to support the position and/or form of the charge coil.

Additionally, in implementations of the electronics module 110, it is desirable to support the position and/or form of the charge coil during the assembly process, as the header of the electronics module is being encased in the polymeric encasing material, and during the period in which the encasing material is setting. Accordingly, a support component may be utilised to provide the charge coil with the desirable support.

Figure 11:
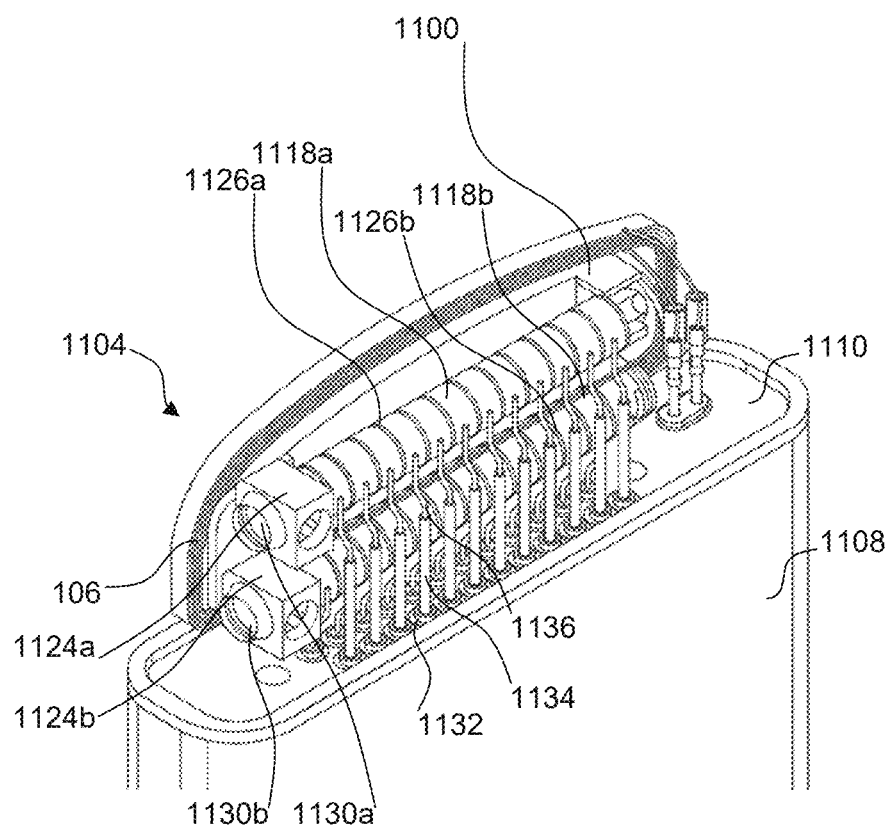
FIG. 11 illustrates a header of an electronics module, according to an implementation of the present technology.

FIG. 11—An Implementation of a Header

FIG. 11 illustrates a header 1104 of an electronics module 110, according to an implementation of the present technology. The header 1104 is coupled to the body 1108 of the electronics module 110. The header 1104 comprises a first contact assembly 1118a, a second contact assembly 1118b, a charge coil 106 and a support component 1100.

The first contact assembly 1118a comprises a plurality of output terminals, including output terminal 1126a, and a receiving block 1124a. The receiving block 1124a is configured to receive a stimulation lead (not shown) via the receiving aperture 1130a. Similarly, the second contact assembly 1118b comprises a plurality of output terminals, including output terminal 1126b, and a receiving block 1124b. The receiving block 1124b is configured to receive a stimulation lead (not shown) via the receiving aperture 1130b. The stimulation lead is configured to deliver the stimulation energy from the battery under control by the stimulation electronics. In the implementation illustrated in FIG. 11, the first contact assembly 1118a is positioned above the second contact assembly 1118b relative to the upper surface of the lid 1110.

The electronics module 110 further comprises a plurality of feedthroughs through which feedthrough wires extend. For example, feedthrough wire 1136 extends through feedthrough 1132, such that feedthrough wire 1136 is electrically coupled to electronics within the electronics module 110. A ferrule 1134 may be included to provide structural support to the feedthrough wire 1136.

FIG. 11 illustrates a header that has been partially assembled. As described in further detail in relation to FIG. 22, the assembly of the header, and the electronics module as whole, comprises a step of electrically coupling the contact assembly to stimulation electronics within the body of the device. When assembled, the feedthrough wires are electrically coupled to the output terminals. For example, when assembled, feedthrough wire 1136 is electrically coupled to output terminal 1126*a*.

The support component 1100 is positioned to abut the first and the second contact assemblies. The support component 1100 may be comprised of a material that does not conduct electricity and is sufficiently rigid to support the form and position of the charge coil 106. In one implementation, the support component 1100 is formed of epoxy or silicone which has been set before being positioned within the header to support the charge coil. In other implementations, the charge coil support component is comprised of plastic or a suitable polymer.

A charge coil may be positioned in a looped form by being wound around an inner or outer perimeter of a support component. In other implementations, the support component may comprise two or more protrusions, upon which the charge coil may be wound.

For efficient and effective transcutaneous inductive charging, it may be desirable that the charge coil is positioned such that the plane of the charge coil will be substantially parallel to the plane of the skin of the patient when the electronics module 110 is implanted in the patient.

Furthermore, it may be desirable for the charge coil to be comprised of multiple loops of a wire rather than a single wire loop. For example, to reduce heat generated during transcutaneous electromagnetic induction, the charge coil may be comprised of a plurality of wire loops rather than a single wire loop.

It may be desirable to position the charge coil at a particular position relative to other components of the header, and/or relative to the body of the electronics module. For example, it may be desirable to position the charge coil at a set distance from the lid of the body to avoid or minimise electromagnetic interaction between the charge coil and the lid of the body. In some implementations, it may be desirable to position the charge coil such that the coil is positioned in a plane that is substantially perpendicular to the lid of the body.

Additionally, in some implementations, to ensure continuity of performance of the implanted electronics module, it may be desirable to ensure that the components of the header do not shift, rotate or translate during or after implantation of the electronics module in the patient. Accordingly, it may be desirable to support the support component relative to other components of the header.

Supporting the Support Component on the Lid

To support the position of the charge coil relative to the position of the other components of the header, the support component may be attached to, or abutted to, the lid of the body such that the support component is in contact with the lid. The support component may be adhered to the lid with adhesive, or otherwise attached to the lid of the body.

If the support component is positioned to be in contact with the lid of the body then a portion of the upper surface of the lid is covered by the support component. Accordingly, at the time of casting the header in the encasing material, the flow of the encasing material around the support component and over the lid may be hindered by the portions of the support component that are in contact with the lid. This may have adverse effects, as described in relation to the example implementation illustrated in FIG. 12.

Figure 12:
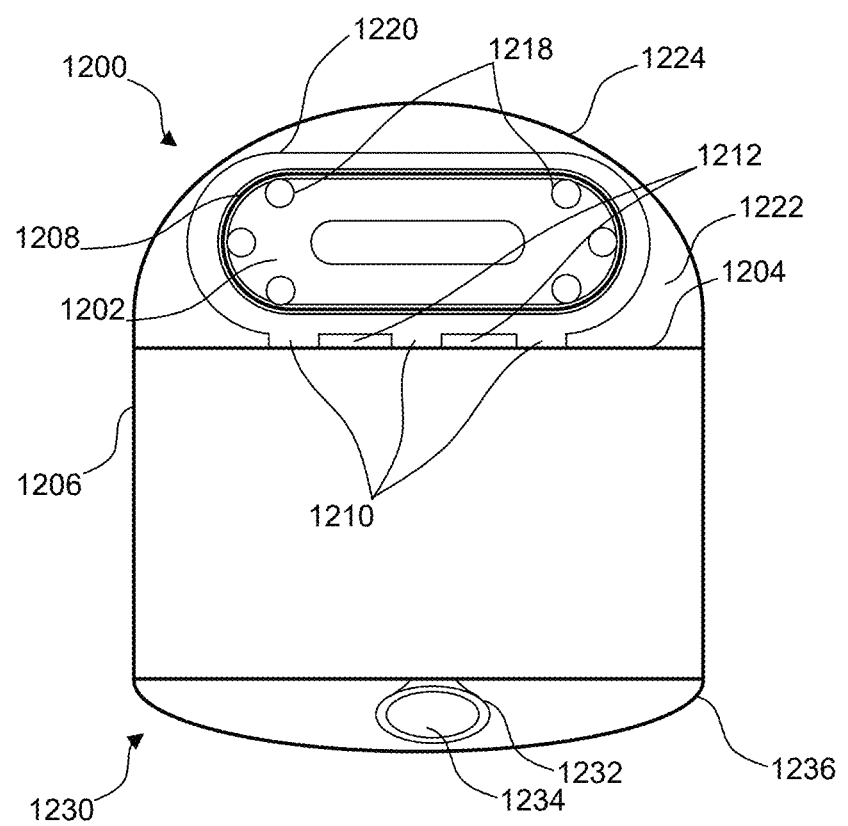
FIG. 12 illustrates a portion of an electronics module of a neural stimulation device, according to an implementation of the present technology.

FIG. 12—Support Component in Contact with the Lid

FIG. 12 illustrates an electronics module of a neural stimulation device, according to an implementation of the present technology. The electronics module includes a body 1206, a header 1200 and a footer 1230. The header 1200 comprises a charge coil support component 1202 and a charge coil 1208. The footer 1230 comprises a communication antenna 1232 and a communication antenna support core 1234. The components of the footer 1230 are encased in an encasing volume 1236, and the components of the header 1200 are encased in an encasing volume 1224.

The charge coil 1208 is supported by the support component 1202 in a position around what may be called an inner perimeter of the support component 1202. More specifically, the charge coil 1208 is positioned around six cylindrical protrusions, 1218, of the support component 1202. The charge coil 1208 is also supported by a flange 1220 extending around the outer perimeter of the support component, such that the loop formed by the charge coil 1208 is supported internally by the six protrusions, 1218, and externally by the flange 1220.

The support component 1202 comprises three feet 1210 which each adjoin the lid of the body 1206. The feet 1210 may be glued to the lid 1204 of the body 1206, for example by silicone, epoxy glue or adhesive. Between the feet 1210 of the support component 1202 are raised sections of the support component which do not adjoin the lid of the body 1206. Accordingly, there are narrow, elongated cavities 1212 which are bounded by the lid 1204, the support component 1202 and the feet 1210 of the support component 1202. In some implementations, there may also be cavities between other components of the header, the lid, and the support component.

The header 1200 may further comprise other components, such as a contact assembly, which are not shown in FIG. 12.

The header 1200 of the electronics module has been cast in liquid encasing material, such as epoxy. The liquid encasing material has set to form set encasing material 1222, which has boundaries defined by the lid 1204 and the curved surface of the encasing volume 1224.

Air Bubbles

During casting of the header components in the liquid encasing material, pockets of air (or other gases) may become encased by the liquid polymeric encasing material and trapped when the liquid polymeric encasing material sets. For brevity, these pockets of gas will be referred to as 'air bubbles'. Suitable polymeric encasing materials for header 1004 and the footer 1006 include urethanes, such as e.g., TECOTHANE®, an aromatic polyether-based thermoplastic polyurethane sold by the Thermedics Polymeric Products Company of Wilmington, Mass.

Air bubbles may be more prevalent in areas of the header where there is a small cavity or gap between components of the header and/or where header components of different material are in close proximity. Accordingly, during the casting process, as the liquid encasing material flows between the header components and displaces the air surrounding the header components, air may not be able to disperse from the small gaps before the air becomes surrounded by the liquid encasing material. As the liquid encasing material sets, the trapped air becomes an air bubble.

With reference to the example header shown in FIG. 12, air bubbles may form in the elongated gaps 1212 between the support component and the lid. Similarly, air bubbles may form around the feet 1210 of the support component, especially where the feet are positioned close to other components of the header, in gaps such as 1212. Air bubbles may also form in other areas within the header.

Air bubbles may be undesirable for a number of reasons, depending upon the implementation of the present technology.

The surface of the lid that is external to the body 1206 of the electronics module, and upon which the contact assembly is mounted, may be called the upper surface of the lid. In one example, it may be undesirable for air bubbles to form on or near the upper surface of the lid, e.g. at intersection of the lid 1204 and the encasing material. The presence of air bubbles at or near the upper surface of the lid may reduce the surface area of the lid that is in contact with the encasing material, and may therefore reduce the adherence of the encasing material to the upper surface of the lid. A reduction in the adherence of the encasing material to the upper surface of the lid may affect the durability of the electronics module and the hermetical seal of the module during implanted use.

In one implementation, the upper surface of the lid is prepared to adhere well with the encasing material. The upper surface of the lid may be blasted with an aggressive media, such as sand granules, to generate a rough upper surface of the lid. The rough upper surface of the lid is configured to adhere more durably to the encasing material compared to a lid with a smoother upper surface. In one implementation silane (or silicon hydride, or any of a series of covalently bonded compounds containing silicon and hydrogen) is applied to the upper surface of the lid during the manufacturing and assembly process. After the silane has been applied to the upper surface of the lid, the header is cast in the encasing material and the encasing material adheres to the upper surface of the lid.

The upper surface of the lid may comprise design features that are configured to aid the adherence of the encasing material to the upper surface of the lid. For example, in one implementation, the upper surface of the lid comprises a flange extending around a perimeter of the lid. The flange may comprise depressions which are configured to receive encasing material during the casting process. Furthermore, the flange may comprise protrusions which are configured to extend into the form of the encasing material during the casting process.

Additionally, the air pressure of the air within the air bubbles may be influenced by temperature and other factors. Accordingly, a change in the temperature of the header may result in a change in the pressure exerted by the air within the air bubble on the inner surface of the air bubble. Such changes in pressure may adversely impact the adherence of the encasing material to the header components or to the upper surface of the lid, thus adversely affecting the durability of the electronic module.

Furthermore, air bubbles may adversely affect the translucidity of the encasing material, thus partially obscuring the header components from visual inspection. In some situations, a visual inspection of the header components is performed to verify that the header components are located in the correct position and are free from defects. If an air bubble is present, the air bubble may prevent a thorough visual inspection of the header components.

In accordance with the present technology, there is provided a header arrangement configured to ameliorate some or all of the abovementioned issues.

In particular, there is provided a header arrangement in which the support component is a separated position relative to the upper surface of the lid, such that the support component does not contact the upper surface of the lid and therefore does not impede the formation of encasing material on the upper surface of the lid. In one implementation of the header arrangement, the support component is configured to be supported in position by at least one contact assembly of the header, such that the support component is raised above the surface of the lid, allowing encasing material to form between the support component and the lid. Accordingly, the support component is isolated from the lid by the encasing material.

FIGS. 13-16—Support Component Implementation 1

Figure 13:
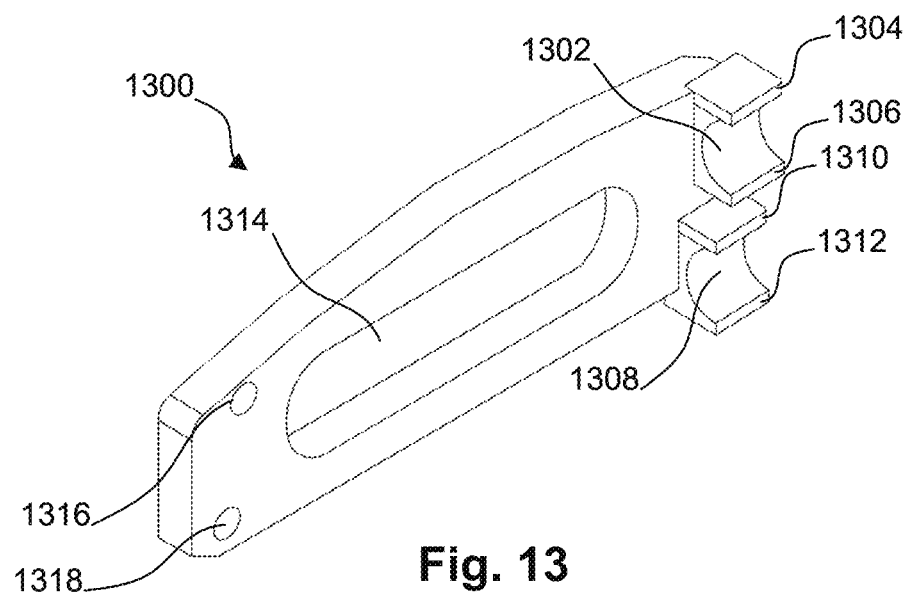
FIG. 13 illustrates a support component, according to an implementation of the present technology.
Figure 16:
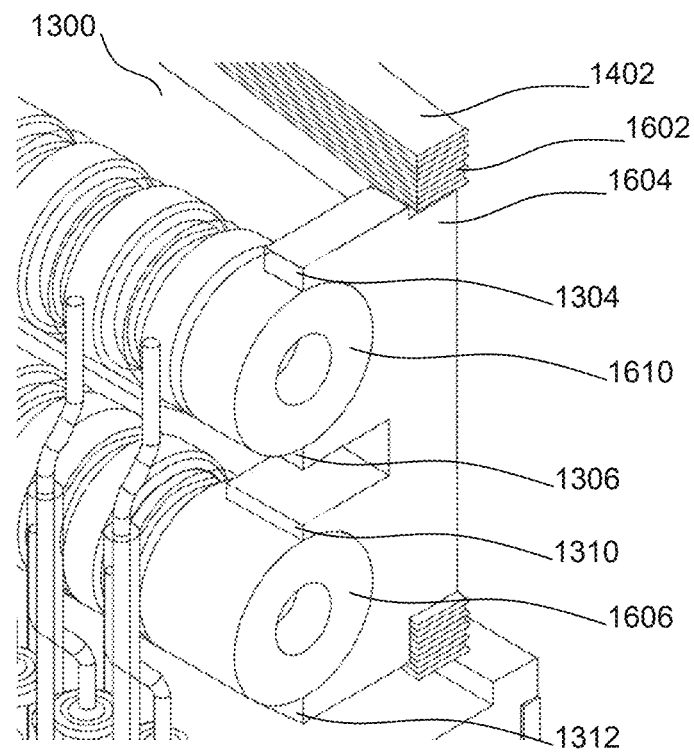
FIG. 16 illustrates another cut-away view of the header of FIG. 15, according to an implementation of the present technology.

FIG. 13 illustrates a support component 1300, according to an implementation of the present technology. The support component 1300 is configured to adjoin a contact assembly in a header of an electronics module. The support component 1300 comprises a first concave surface 1302 which terminates at each of the surfaces 1304 and 1306. Similarly, the support component 1300 comprises a second concave surface 1308, which terminates at each of the surfaces 1310 and 1312. The first and second concave surfaces, 1302 and 1308, are configured to receive, or abut, respective convex curved surfaces of the contact assembly, as illustrated in FIG. 16.

Figure 15:
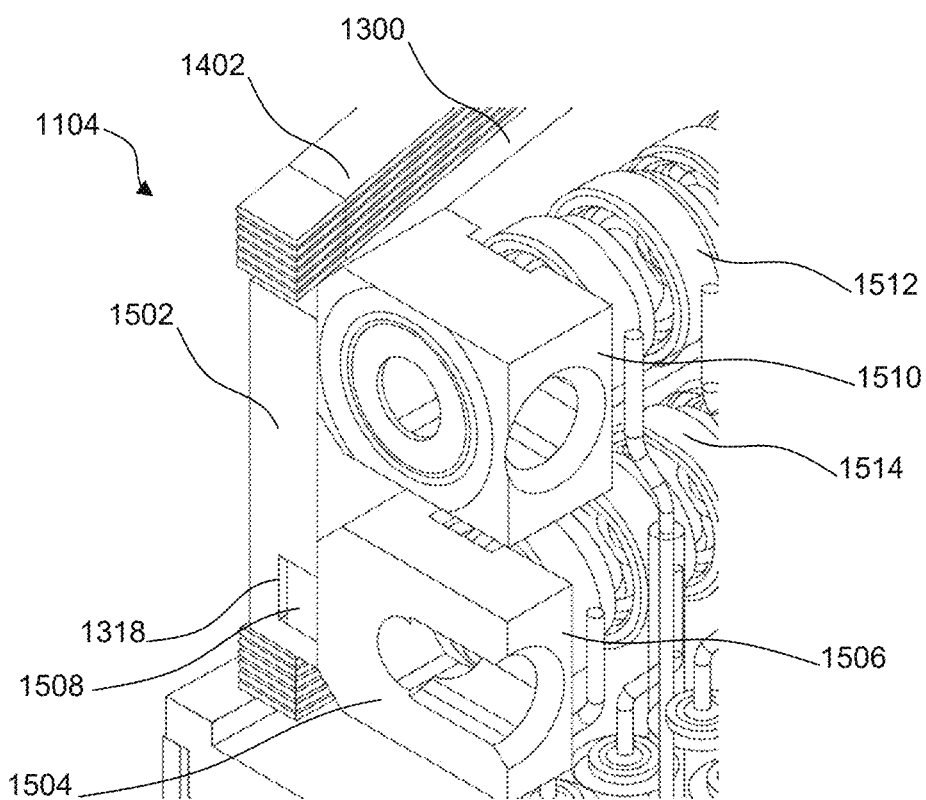
FIG. 15 illustrates a cut-away view of a header, according to an implementation of the present technology.

The support component 1300 further comprises two mounting recesses, 1316 and 1318. Each of the mounting recesses 1316 and 1318 are configured to receive a respective one of two mounting protrusions of the contact assembly, as illustrated in FIG. 15.

In the implementation illustrated in FIG. 13, the mounting recesses, 1316 and 1318, each have a circular cross section; however, in other implementations, a mounting recess may have a cross section that is not circular. For example, a mounting recess may have a square or hexagonal cross section. Furthermore, a mounting recess may taper inwards, such that the recess forms a conical or otherwise tapered volume.

In some implementations, the support component comprises only a single mounting recess. In other implementations, the support component comprises a plurality of mounting recesses. The mounting recesses may be of different shapes or sizes.

Support Component Cavity

The support component 1300 further comprises a cavity 1314 which extends through the body of the support component. The cavity 1314 is configured to allow the encasing material to flow through from one side of the support component to the other side of the support component to provide enhanced encasement of the support component by the encasing material.

Rear View of Support Component

Figure 14:
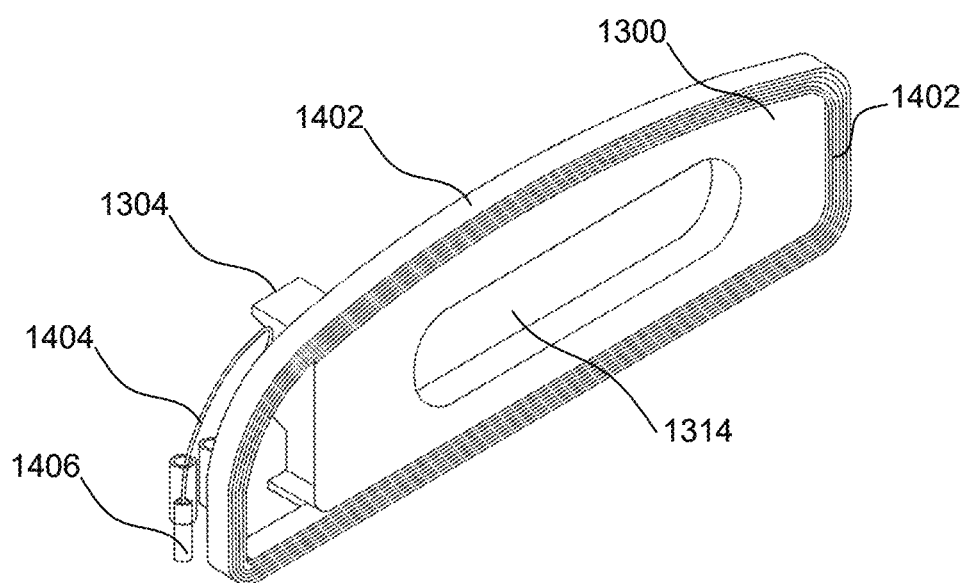
FIG. 14 illustrates the rear view of the support component of FIG. 13, according to an implementation of the present technology.

FIG. 14 illustrates the rear view of the support component 1300, illustrated in FIG. 13, according to an implementation of the present technology. In FIG. 14, a charge coil 1402 has been position around a perimeter of the support component 1300. The charge coil 1402 comprises a plurality of loops of a wire 1404. The wire 1404 is electrically coupled to a battery within the body of the electronics module (not shown).

Reduced Risk of Air Bubbles

As the support component is positioned in a detached position from the upper surface of the lid, and therefore does not abut the upper surface of the lid, the support component does not occupy surface area of the upper surface of the lid. The liquid encasing material may flow between the lid and the support component during the casting process. Accordingly, there is less surface area of the upper surface of the lid occupied at the time of casting the header in the liquid encasing material, and there is a larger contact area between the encasing material and the upper surface of the lid to facilitate a bond between the header and the body of the electronics module.

The additional volume of the cavity space between the support component and the upper surface of the lid, in the implementation of FIG. 13, with respect to the implementation of FIG. 12, may reduce the occurrence of air bubbles forming on or near the lid during the casting process.

Mounting Protrusions

FIG. 15 illustrates a cut-away view of header 1104, according to an implementation of the present technology. The cut-away view illustrates a cross-section 1502 of the support component 1300, and a cross-section of mounting recess 1318. The cut-away view also illustrates a cross-section 1504 of a receiving block 1506 of a second contact assembly 1514.

The header 1104 further comprises a receiving block 1510 of a first contact assembly 1512. The first receiving block 1510 is not positioned in line with the second receiving block 1506. Accordingly, the first receiving block 1510 is not cross-sectioned by the cut-away view of FIG. 15.

Receiving block 1506 of the second contact assembly 1514 comprises a mounting protrusion 1508, which is configured to be positioned in the mounting recess 1318 of the support component 1300. In one implementation, the mounting protrusion 1508 fits tightly within the mounting recess 1318 such that a friction force acts between the surfaces of the recess 1318 and protrusion 1508 to inhibit the protrusion from moving out of the recess 1318. In one implementation, the support component 1300 is comprised of a flexible material, such as silicone or epoxy. The flexible material of the support component 1300 surrounding the mounting recess 1318 deforms to receive the mounting protrusion 1508. In another implementation, adhesive is applied to affix the protrusion within the recess.

In one implementation, the mounting protrusion 1508 is adjoined to the receiving block 1506 of the contact assembly 1514. In another implementation, the mounting protrusion is formed as part of the receiving block.

Receiving block 1510 of the first contact assembly 1512 also comprises a mounting protrusion (not shown). The mounting protrusion of the first receiving block 1510 is positioned in the second mounting recess (not shown) of the support component 1300.

In one implementation, the mounting protrusion is a separate component to the receiving block, but is fixedly adjoined to the receiving block by welding, mechanical affixing means or adhesive. In another implementation, the mounting protrusion is part of the receiving block, having been molded or formed from the same material.

FIG. 16 illustrates another cut-away view of header 1104, according to an implementation of the present technology. The cut-away view illustrates a cross-section 1602 of the charge coil 1402 which comprises a plurality of wire loops wound around the perimeter of the support component 1300.

The header further comprises a first contact assembly 1512, which includes an end section 1610. The header also comprises a second contact assembly 1514, which includes an end section 1606. In the implementation illustrated in FIG. 16, the end sections have a substantially circular cross-section; however, in other implementations the end sections may have different cross-sections.

Illustrated in FIG. 16 is the end surface 1604 of the support component 1300. As described in relation to FIG. 13, the support component 1300 comprises a first concave surface 1302 which terminates at each of the surfaces 1304 and 1306. Similarly, the support component 1300 comprises a second concave surface 1308, which terminates at each of the surfaces 1310 and 1312.

The first concave surface of the support component 1300 is configured to receive the end section 1610 of the first contact assembly. Similarly, the second concave surface of the support component 1300 is configured to receive the end section 1606 of the second contact assembly.

In one implementation, the end section 1610 fits tightly within the first concave surface 1302 such that a friction force acts between the surfaces of the end section and the concave surface to inhibit the end section from moving out of the concave surface. In one implementation, the support component 1300 is comprised of a flexible material, such as silicone or epoxy. The flexible material of the support component 1300 surrounding the concave surface deforms to receive the end section. In another implementation, adhesive is applied to affix the end section within the concave surface.

FIGS. 13 to 16 illustrate an implementation in which the support component is supported in position by the contact assembly such that the support component is positioned in a position that is raised above the upper surface of the lid of the body of the electronics module. This raised position of the support component provides a clearance, or cavity, between the support component and the upper surface of the lid such that encasing material can flow more freely across the lid and occupy the cavity between the support component and the lid.

FIGS. 17-21—Support Component Implementation 2

Figure 17:
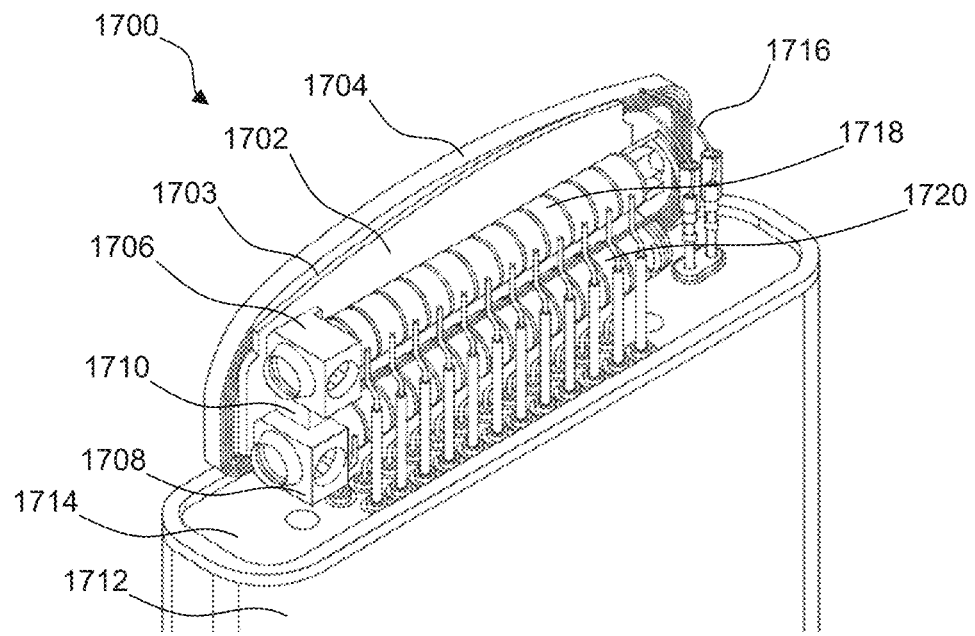
FIG. 17 illustrates a header mounted on the body of an electronics module, according to an implementation of the present technology.

FIG. 17 illustrates a header 1700 mounted on the body of an electronics module, according to an implementation of the present technology. The body comprises a shell 1712 and a lid 1714. The header 1700 comprises a support component 1702 which provides support to a charge coil 1704. The support component 1702 includes a flange 1703, which extends around a substantial part of a perimeter of the support component. The flange is configured to support the position of the charge coil on the support component.

The header 1700 further comprises a first contact assembly 1718 and a second contact assembly 1720. The first contact assembly comprises a first receiving block 1706, and the second contact assembly comprises a second receiving block 1708. There is a gap, or cavity, between the first receiving block 1706 and the second receiving block 1708.

The support component 1702 comprises a mounting protrusion 1710. The protrusion 1710 is configured to fit in the cavity between the first receiving block 1706 and the second receiving block 1708. In one implementation, the protrusion 1710 is configured to rest on the first receiving block 1706 when the header is cast in liquid encasing material. In one implementation, the mounting protrusion 1710 is adhered to either or both of the first receiving block 1706 and the second receiving block 1708.

Figure 18:
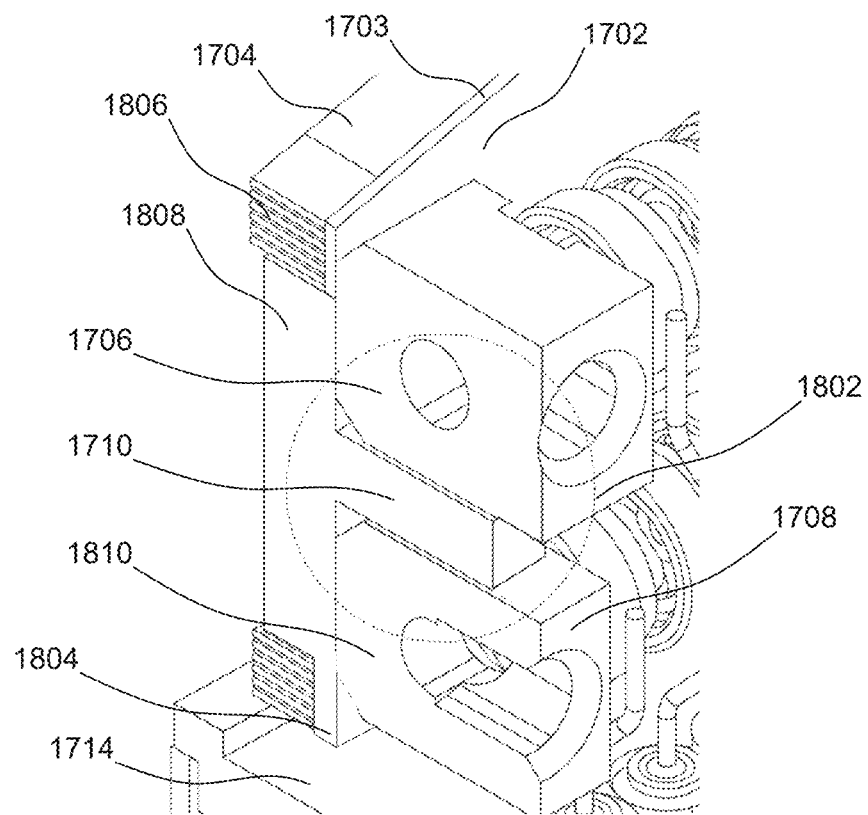
FIG. 18 illustrates a cut-away view of another header, according to an implementation of the present technology.

FIG. 18 illustrates a cut-away view of header 1700, according to an implementation of the present technology. The cut-away view illustrates a cross-section 1806 of the charge coil 1704, a cross-section 1808 of the support component 1702, and a cross-section 1810 of the second receiving block 1708. FIG. 18 further illustrates a cross-section of the mounting protrusion 1710 of the support component 1702, highlighted by dotted line circle 1802 for ready reference.

A bottom section 1804 of the flange of the support component 1702 extends downwards toward the lid 1714 of the electronics module. Importantly, the bottom section 1804 of the flange of the support component does not touch the lid 1714, and there is a clearance between the support component 1702 and the lid 1714 of the electronics module. The space formed by this separation of the support component 1702 and the lid 1714 may be filled with encasing material in response to the header being cast in liquid encasing material.

Figure 19:
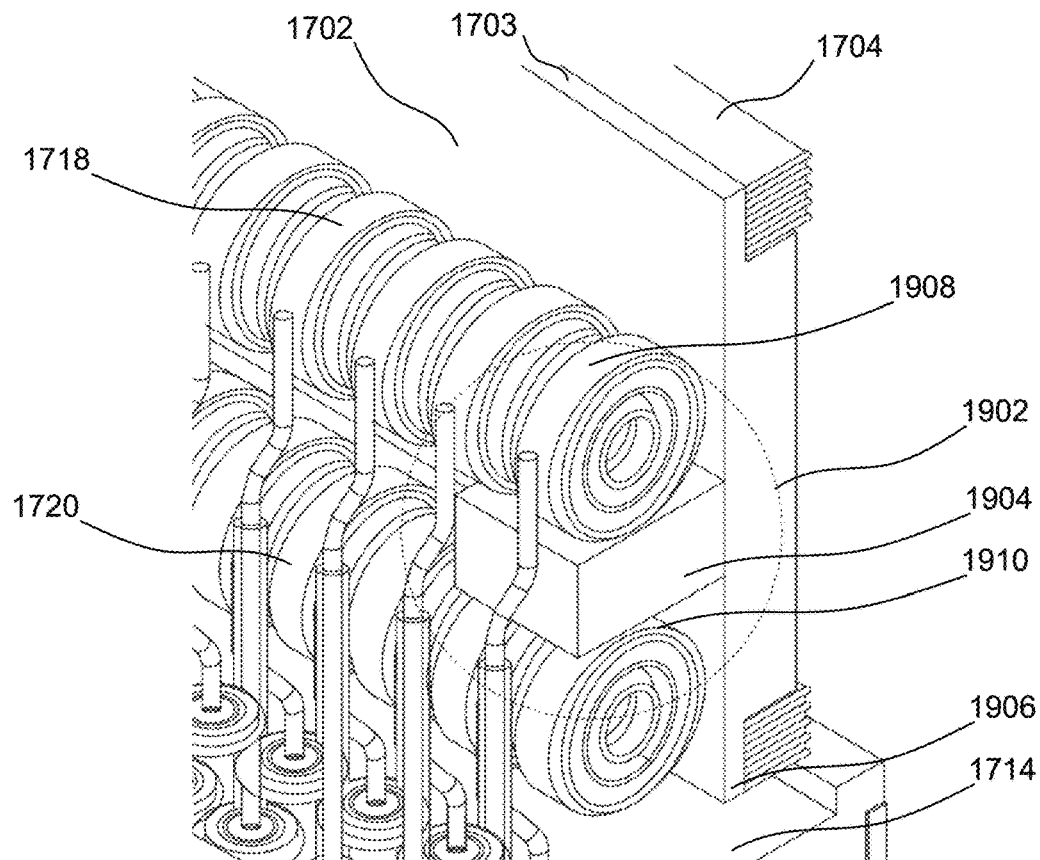
FIG. 19 illustrates another cut-away view of the header of FIG. 18, according to an implementation of the present technology.

FIG. 19 illustrates another cut-away view of header 1700, according to an implementation of the present technology. The first contact assembly 1718 comprises a first end section 1908, and the second contact assembly 1720 comprises a second end section 1910. There is a gap, or cavity, between the first end section 1908 and the second end section 1910.

The support component 1702 comprises a mounting protrusion 1904 which is configured to fit in the cavity between the first and second end sections, 1908 and 1910. The mounting protrusion 1904 is highlighted by dotted line circle 1902 for ready reference. In one implementation, the protrusion 1904 is configured to rest on the first end section 1908 when the header is cast in liquid encasing material. In one implementation, the mounting protrusion 1904 is adhered to either or both of the first end section 1908 and the second end section 1910.

A bottom section 1906 of the flange of the support component 1702 extends downwards toward the lid 1714 of the electronics module. Importantly, the bottom section 1906 of the flange of the support component does not touch the lid 1714, and there is a clearance between the support component 1702 and the lid 1714 of the electronics module. The space formed by this separation of the support component 1702 and the lid 1714 may be filled with encasing material in response to the header being cast in liquid encasing material.

Figure 20:
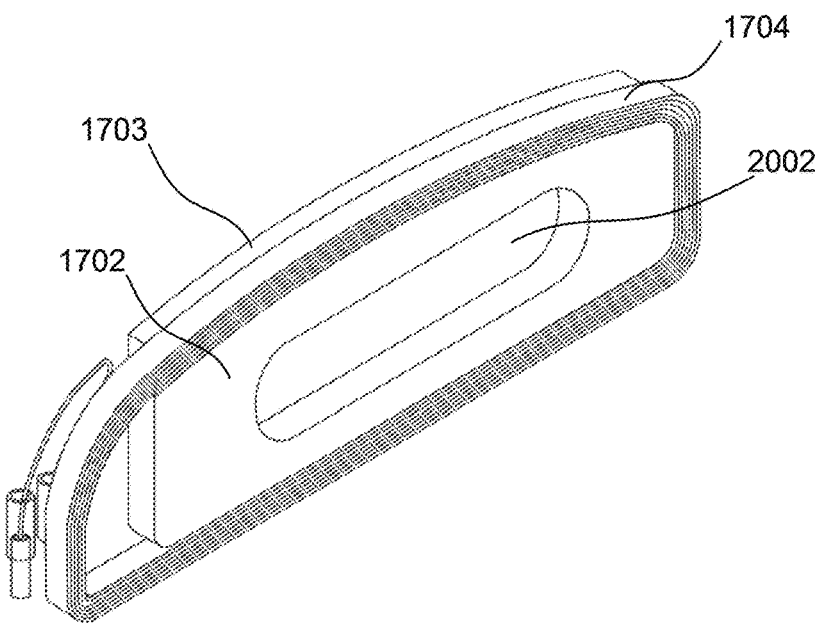
FIG. 20 illustrates a perspective view of a support component and a charge coil, according to an implementation of the present technology.

FIG. 20 illustrates a perspective view of the support component 1702 and the charge coil 1704, according to an implementation of the present technology. The support component 1702 comprises a cavity 2002. The cavity 2002 is configured to allow the encasing material to flow through from one side of the support component to the other side of the support component to provide enhanced coverage of the support component by the encasing material.

Figure 21:
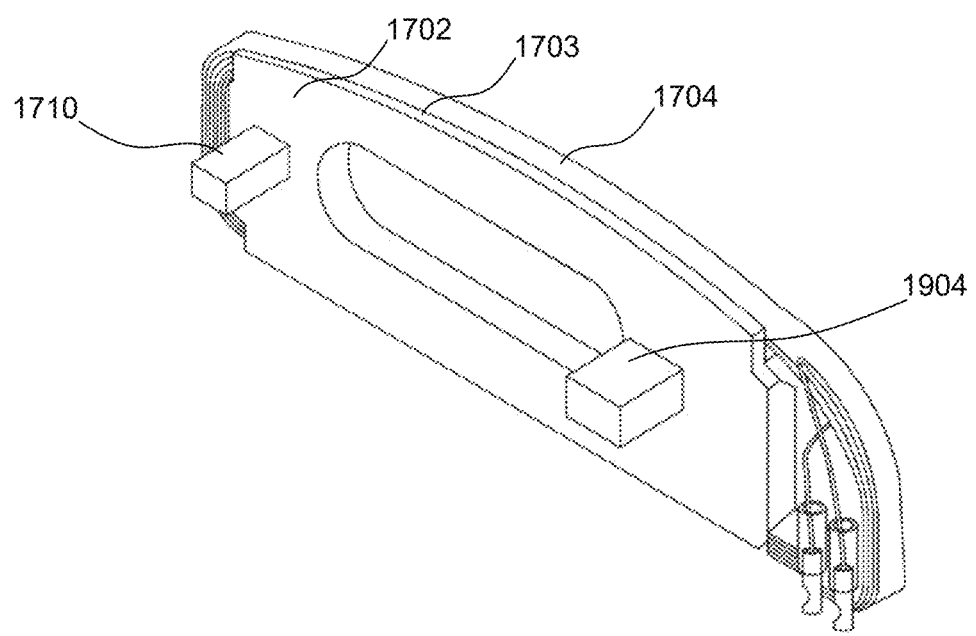
FIG. 21 illustrates another perspective view of the support component and the charge coil of FIG. 20, according to an implementation of the present technology.

FIG. 21 illustrates another perspective view of the support component 1702 and the charge coil 1704, according to an implementation of the present technology. The support component 1702 comprises a first mounting protrusion 1710, which is configured to fit between the first receiving block 1706 and the second receiving block 1708. The support component 1702 further comprises a second mounting protrusion 1904, which is configured to fit between the first and second end sections, 1908 and 1910.

Although FIGS. 12 to 21 illustrate headers comprising a first and a second contact assembly, a header may comprise only a single contact assembly, or may comprise more than two contact assemblies.

Figure 22:
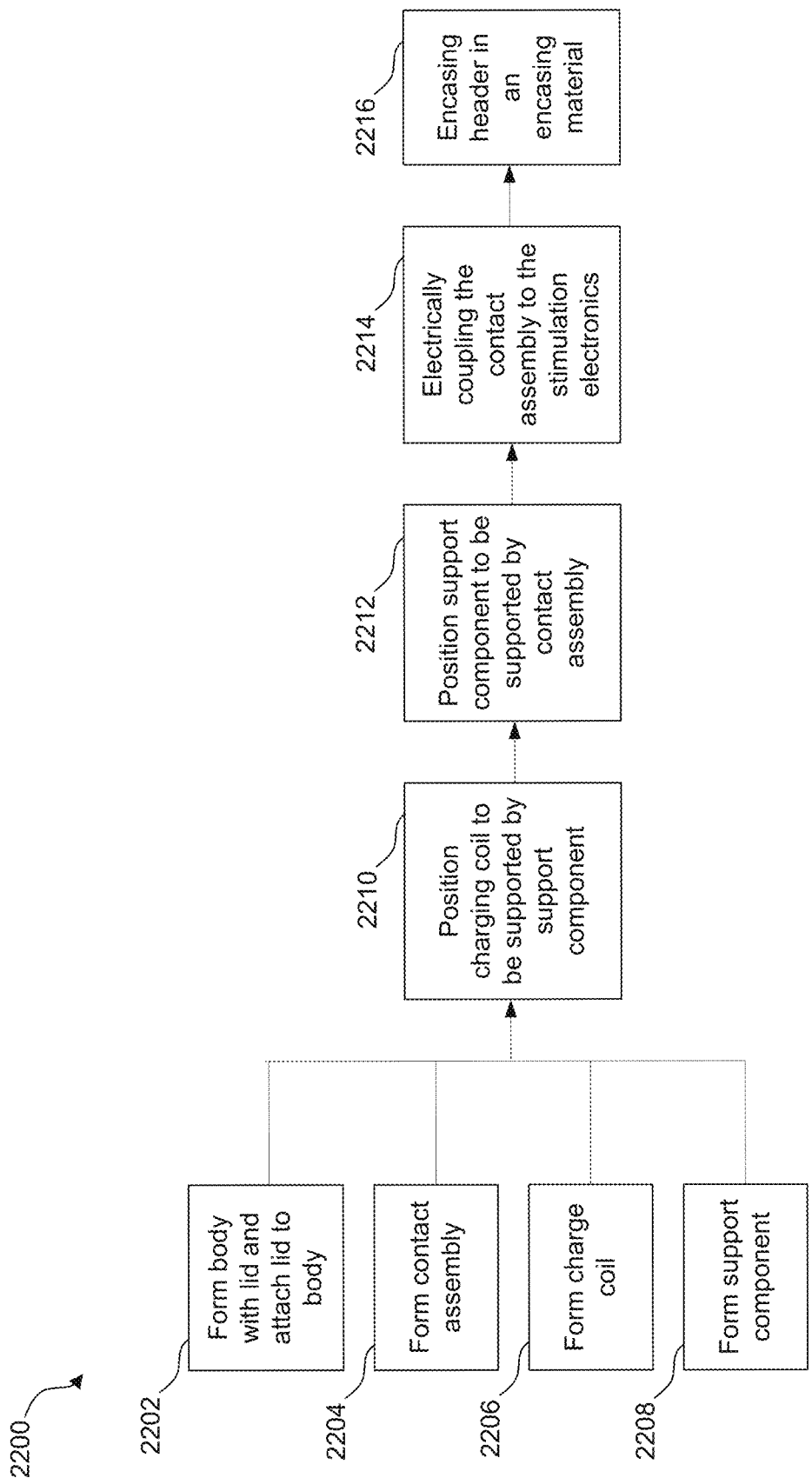
FIG. 22 illustrates a method of manufacturing an implantable neural stimulation device, according to an implementation of the present technology.

FIG. 22—Method of Manufacture

FIG. 22 illustrates a method 2200 for manufacturing an implantable neuromodulation device, according to an implementation of the present technology.

Step 2202 comprises forming the body of the implantable neuromodulation device. The body is configured to contain stimulation electronics and a battery. Step 2202 further comprises forming a lid for the body, wherein the lid includes at least one feedthrough through which at least one wire may extend through the lid. The lid is configured to seal the stimulation electronics and battery inside the body, and to allow electronic coupling between the stimulation electronics and a header assembly located outside the body of the device. Step 2202 further comprises attaching the lid to the body to seal the stimulation electronics and battery inside the body.

Method 2200 further comprises steps for manufacturing a header of the implantable neuromodulation device. The header comprises a charge coil, and at least one contact assembly to deliver stimulation energy from the battery under the control of stimulation electronics.

Step 2204 comprises forming a contact assembly, such as a BalStack® assembly. Step 2206 comprises forming a charge coil to enable transcutaneous inductive transfer to charge the battery of the device. The charge coil may comprise at least one wire, which may be formed into a plurality of substantially coplanar and concentric wire loops.

Step 2208 comprises forming a support component. The support component may be a moulded shape prepared by setting liquid mouldable material, such as epoxy or silicone, in a prepared mould. Alternatively, the support component may be 3D printed, or pressed or otherwise formed into a desirable shape. The shape of the support component may be configured to enable the support component to be supported by the contact assembly.

Step 2210 comprises positioning the charge coil to be supported by the support component. In one implementation, step 2210 comprises winding the at least one wire of the charge coil around a perimeter of the support component. Step 2212 comprises positioning the support component to be supported by the contact assembly. In one implementation, step 2212 comprises inserting a mounting protrusion of the contact assembly into a mounting recess of the support component. In one implementation, step 2212 comprises inserting a mounting protrusion of the support component into a mounting recess or cavity of the contact assembly. In one implementation, step 2212 comprises deforming the support component to fit over a surface of the contact assembly.

In one implementation, the charge coil is positioned to be supported by the support component before the support component is positioned to be supported by the contact assembly. In other words, step 2210 may be performed before step 2212 is performed. For example, the charge coil may be wound around a perimeter of the support component, then the support component may be mounted on the contact assembly.

In another implementation, the support component may be positioned to be supported by the contact assembly before the charge coil is positioned to be supported by the support component. In other words, step 2212 may be performed before step 2210 is performed. For example, the support component may be mounted on the contact assembly, then the charge coil may be wound around a perimeter of the support component.

Step 2214 comprises electrically coupling the contact assembly to the stimulation electronics, which are in the body of the device. Electrically coupling may comprise welding wires of the contact assembly to wires extending from the stimulation electronics through the feedthroughs of the lid. Step 2214 may further comprise electrically coupling the charge coil to the battery, which is inside the body.

Step 2214 may further comprise mounting the contact assembly to the lid of device. The contact assembly may be mounted to the lid via mechanical means, or by adhesive. Advantageously, the positioning of the support component to be supported by the contact assembly, in step 2212, means that the support component is indirectly coupled to the lid of the device, via the coupling of the contact assembly to the lid of the device. Accordingly, manufacturing method may not comprise the step of mounting, or coupling, the support component to the lid of the device. As a result, the manufacturing and assembly steps may be reduced by positioning the support component to be supported by the contact assembly. Advantageously, a reduction in manufacturing and assembly steps can reduce the number of points of failure for a manufacturing process, and the complexity of the manufacturing process.

Furthermore, as the support component is positioned to be supported by the contact assembly, rather than by the lid, the support component may not be glued to the lid. Accordingly, the use of adhesive or mechanical coupling may be reduced.

Step 2216 comprises encasing at least the header in an encasing material. In one implementation, the header portion of the device is submerged in liquid encasing material until the liquid encasing material sets. In another implementation, the header portion of the device is placed into a mold into which liquid encasing material is introduced.

Footer of the Electronics Module

Turning again to FIG. 12, which illustrates an electronics module of a neural stimulation device, according to an implementation of the present technology. The electronics module includes a body 1206, a header 1200 and a footer 1230. The footer 1230 comprises a communication antenna 1232 and a communication antenna support core 1234. The communication antenna is a radio frequency (RF) communication antenna that provides wireless transcutaneous communication between the stimulation electronics and an external communication device, such as a remote controller (RC) 820 and/or a Clinical System Transceiver (CST) 830.

In an electronics module for a neuromodulation device, the communication antenna may be positioned in the header of the electronics module, in proximity to a charge coil and one or more contact assemblies. However, in some implementations, it is advantageous to position the communication antenna in a footer of the electronics module, such that the antenna is separate from, and distal from the charge coil and the contact assemblies.

Implementations in which the antenna is positioned distal from the charge coil are described by the present applicant in International Patent Publication No. WO 2020/000039, the contents of which are incorporated herein by reference.

Positioning the communication antenna 1232 in a volume that is external to the body 1206 may provide for improved RF communication efficiency and fidelity. For example, positioning the communication antenna 1232 within a volume that is separate from the volume in which the charge coil 1208 is positioned obviates the need for the communication antenna and charge coil to be configured to share the same volume. Accordingly, the size and form of the charge coil in the header 1200 is not constrained by the size and form of the communication antenna. In some implementations, to provide a desirable energy coupling between the charge coil and an external charger or external charge coil, the charge coil may be as large as possible. As the communication antenna is located in a separate volume to the charge coil, e.g. in the footer, the charge coil can occupy substantive space in the header.

Similarly, by positioning the communication antenna in the footer 1230, the size and form of the communication antenna is not constrained by the size and form of the charge coil, or the size and form of the other components within the header, such as the contact assembly or charge coil support component. Accordingly, in some implementations, the communication antenna may be configured with two loops of wire (rather than a single loop), for enhanced performance. Additionally, the wire loops of the communication antenna may be aligned in different planes, e.g. planes that are perpendicular to each other. The arrangement of communication antenna loops along different planes may facilitate improved transcutaneous RF communication, especially in situations in which the electronics module is implanted within the patient along a plane that is not parallel to the plane of the patient's skin. Due to volume constraints, the configuration of antenna loops in differing planes may be difficult to configure or may be not possible in implementations in which the communication antenna is positioned within the header along with the charge coil and/or other header components.

Additionally, positioning the communication antenna 1232 at one end of the body provides the opportunity to locate the communication electronics at a position within the body 1206 that is proximal to the communication antenna in footer 1230. The close proximity of the communications electronics to the communications antenna 1232 may advantageously reduce signal/line loss and thereby improve transcutaneous communication between the electronics module and an external device or external service provider. Additionally, the number of feedthroughs through the upper lid is reduced because the wiring for the communication antenna feeds through the lower lid, into the footer.

Furthermore, as the charge coil 1208 and the communication antenna 1232 are located at opposite ends of the body 1206, interference between the charge coil 1208 and the communication antenna 1232 may be reduced. In some implementations, a preferred position for a communication antenna is a position that is not close to other conductive objects which may act as a waveguide and a secondary radiating antenna. Accordingly, positioning the communication antenna within the footer, distal from the charge coil and other components within the header, may allow for unimpeded RF signal propagation for the communication antenna.

The inventors have noted that by positioning the communication antenna in a footer at one end of the body of the electronics module, and positioning the charge coil in a header at the opposite end of the body, a material improvement in RF antenna efficiency may be realised.

The inventors have also noted that in implementations in which the communication antenna is positioned in the header, in proximity to one or more contact assemblies within a closed loop neural stimulus (CLNS) device, RF noise from the communication antenna may adversely affect the fidelity of measurements of the ECAP response evoked by the CLNS device. The inventors noted that RF noise emanating from the communication antenna generated inaccuracies in some of the ECAP measurements obtained from electrodes coupled to contacts in the header of the CLNS device. In particular, the inventors observed an artefact effect on some of the reference electrodes, which provide a reference voltage value during measurement of an ECAP response. This artefact effect on the reference electrode produced an inaccurate or unstable reference voltage, which resulted in an inaccurate or unstable measurement of the ECAP response.

Figure 23:
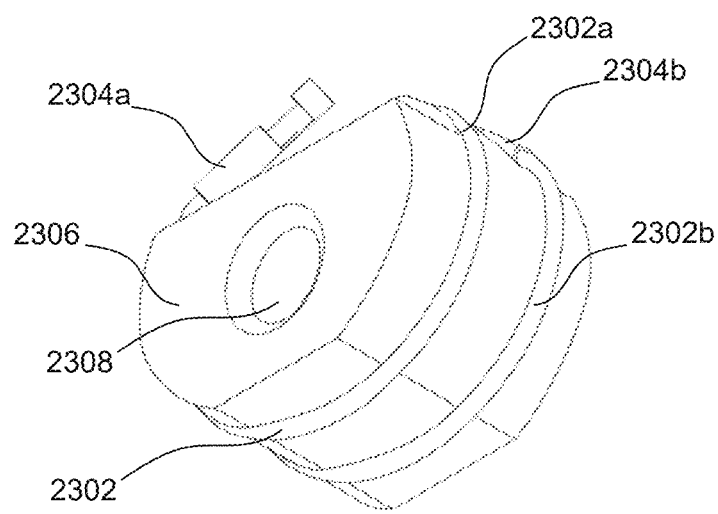
FIG. 23 illustrates a first perspective view of a communication antenna supported by a communication antenna support core, according to an implementation of the present technology.
Figure 24:
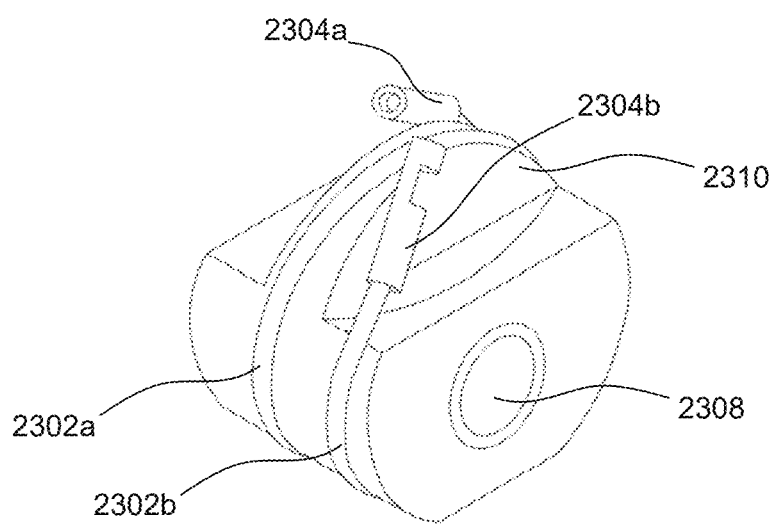
FIG. 24 illustrates a second perspective view of a communication antenna supported by a communication antenna support core, according to an implementation of the present technology.

FIGS. 23 and 24—Communication Antenna Support Core

FIG. 23 illustrates a first perspective view of a communication antenna 2302 supported by a communication antenna support core 2306, according to an implementation of the present technology.

An electronics module of an implantable neuromodulation device may comprise a communication antenna to facilitate transcutaneous communication between the electronics in the electronics module and a communication device external to the patient. In some implementations, it may be desirable to position the communication antenna in a footer of the electronics module, as illustrated in FIGS. 10 and 12, to achieve a desired performance of the electronics module.

A communication antenna may comprise a wire configured into a plurality of wire loops. In the implementation illustrated in FIG. 23, the communication antenna 2302 comprises a wire configured into a first loop 2302*a* and a second loop 2302*b*. The communication antenna is configured to be electrically coupled with the electronics inside the body of the electronics module via wires extending through feedthroughs in the base of the body of the electronics module. Ferrules 2304*a* and 2304*b* provide a means to couple the communication antenna to wires extending through the feedthroughs in the base of the body.

The wire loops 2302*a* and 2302*b* of the communication antenna 2302 are supported in position by a support core 2306.

FIG. 24 illustrates a second perspective view of a communication antenna 2302 supported by a communication antenna support core 2306, according to an implementation of the present technology. The support core 2306 comprises a ridge 2310 which supports the form of wire loop 2302*a*.

In one implementation, the components of the footer of the electronics module, including the communication antenna and the support core, are encased in liquid polymeric encasing material to hermetically seal the components. The support core 2306 comprises a cavity 2308 which extends through the support core 2306. The cavity 2308 is configured to allow the encasing material to flow through from one side of the support core to the other side of the support core to provide enhanced encasement of the support core by the encasing material.

It will be appreciated by persons skilled in the art that numerous variations and/or modifications may be made to the above-described embodiments, without departing from the broad general scope of the present disclosure. The present implementations are, therefore, to be considered in all respects as illustrative and not restrictive.

The invention claimed is:

1. An implantable neural stimulation device comprising:
   a body containing stimulation electronics, and a battery to provide stimulation energy;
   a lid, coupled to the body, the lid configured to at least partially seal the body;
   a header coupled to the body of the device, the header comprising:
      a contact assembly electrically coupled to the stimulation electronics via at least one first feedthrough wire extending through the lid, the contact assembly configured to connect to a stimulation lead to deliver the stimulation energy from the battery under control by the stimulation electronics;
      a charge coil configured to charge the battery; and
      a support component configured to support the charge coil,
   wherein:
      the support component is supported in position by the contact assembly; and
      the support component is in a separated position relative to an upper surface of the lid.

2. The implantable neural stimulation device of claim 1, wherein the contact assembly comprises at least one output terminal, an end section and a receiving block.

3. The implantable neural stimulation device of claim 2, wherein the contact assembly comprises a mounting protrusion and wherein the mounting protrusion of the contact assembly is positioned on the receiving block of the support component.

4. The implantable neural stimulation device of claim 3, wherein the mounting protrusion of the contact assembly is adjoined to the receiving block of the contact assembly.

5. The implantable neural stimulation device of claim 1, wherein the contact assembly comprises a first contact assembly and a second contact assembly.

6. The implantable neural stimulation device of claim 1, wherein the support component is adhered to the contact assembly by adhesive.

7. The implantable neural stimulation device of claim 1, wherein the contact assembly comprises a mounting recess, and the support component comprises a mounting protrusion, and wherein the mounting protrusion of the support component is positioned adjoined to the contact assembly.

8. The implantable neural stimulation device of claim 1, wherein the charge coil comprises at least one wire formed into a plurality of substantially concentric and substantially coplanar wire loops.

9. The implantable neural stimulation device of claim 8, wherein the support component is configured to support the form of the at least one wire loop of the charge coil.

10. The implantable neural stimulation device of claim 1,
    wherein the support component comprises a support body and a flange,
    wherein the flange extends around a portion of the support body, and
    wherein the flange is configured to support the position of the charge coil on the support component.

11. The implantable neural stimulation device of claim 10, wherein the support component further comprises a cavity extending through the support body.

12. The implantable neural stimulation device of claim 1, further comprising a footer coupled to the body of the device, the footer comprising:
    a communication antenna electrically connected to the stimulation electronics by at least one second feedthrough wire extending through the body spaced from the at least one first feedthrough wire; and
    a support core configured to support the communication antenna.

13. The implantable neural stimulation device of claim 12, wherein the communication antenna comprises at least one wire formed into a wire loop, and wherein the support core is configured to support the form of the wire loop of the communication antenna.

14. The implantable neural stimulation device of claim 12, wherein the footer comprises a second polymeric encasing material that encases at least the communication antenna, and wherein the second polymeric encasing material of the footer is separate and spaced from a first polymeric encasing material of the header.

15. The implantable neural stimulation device of claim 1, wherein there is clearance between the support component and the lid.

16. The implantable neural stimulation device of claim 15, wherein the contact assembly comprises a receiving block, and the support component comprises a protrusion that is configured to be mounted on the receiving block.

17. A method of manufacturing an implantable neural stimulation device, the device comprising a body comprising stimulation electronics and a battery, a header comprising a charge coil, and at least one contact assembly to deliver stimulation energy from the battery under the control of stimulation electronics, the method comprising:
- forming the body with at least one lid, wherein the lid includes at least one feedthrough;
- attaching the lid to the body to seal the stimulation electronics and battery inside the body;
- forming the at least one contact assembly;
- forming the charge coil;
- forming a support component;
- positioning the charge coil to be supported by the support component;
- positioning the support component to be supported by the contact assembly so that the support component is in a separated position relative to an upper surface of the lid;
- electrically coupling the contact assembly to the stimulation electronics via at least one feedthrough wire extending through the at least one feedthrough of the lid; and
- encasing at least the support component in a polymeric encasing material.

18. The method of claim 17,
wherein the step of positioning the support component to be supported by the contact assembly comprises providing a clearance between the support component and the lid.

19. The implantable neural stimulation device of claim 17, wherein method comprises forming a receiving block of the contact assembly, and positioning a protrusion of the support component on the receiving block.

* * * * *